US006331259B1

(12) United States Patent
Ozaki et al.

(10) Patent No.: US 6,331,259 B1
(45) Date of Patent: Dec. 18, 2001

(54) METHOD FOR MANUFACTURING INK JET RECORDING HEADS

(75) Inventors: Teruo Ozaki, Yokohama; Masahiko Ogawa, Hino; Masami Ikeda, Tokyo; Ichiro Saito; Takayuki Yagi, both of Yokohama; Hiroyuki Ishinaga, Tokyo; Toshio Kashino, Chigasaki; Tomoyuki Hiroki, Zama; Yoshiyuki Imanaka, Kawasaki; Masahiko Kubota, Tokyo; Muga Mochizuki, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/205,172

(22) Filed: Dec. 4, 1998

(30) Foreign Application Priority Data

| | | |
|---|---|---|
| Dec. 5, 1997 | (JP) | 9-336106 |
| Apr. 16, 1998 | (JP) | 10-106293 |
| Dec. 3, 1998 | (JP) | 10-344720 |
| Dec. 4, 1998 | (JP) | 10-346075 |

(51) Int. Cl.[7] .................... G01D 15/20; B44C 1/22
(52) U.S. Cl. .................... 216/27; 438/21
(58) Field of Search .................... 216/2, 17, 27, 216/51, 49; 438/21

(56) References Cited

U.S. PATENT DOCUMENTS

| | | | | |
|---|---|---|---|---|
| 4,657,631 | * | 4/1987 | Noguchi | 156/655 |
| 4,670,092 | * | 6/1987 | Motamedi | 156/643 |
| 5,187,499 | * | 2/1993 | Murakami | 347/64 |
| 5,322,594 | | 6/1994 | Bol | 156/634 |
| 5,804,083 | * | 9/1998 | Ishii et al. | 216/2 |
| 5,903,038 | * | 5/1999 | Zhang et al. | 257/417 |
| 6,033,581 | * | 3/2000 | Kobayashi | 216/27 |
| 6,171,510 | * | 1/2001 | Lee | 216/27 |

FOREIGN PATENT DOCUMENTS

| | | |
|---|---|---|
| 0 431 338 A2 | 6/1991 | (EP) . |
| 0 659 565 A2 | 6/1995 | (EP) . |
| 0 750 922 A2 | 1/1997 | (EP) . |
| 57-208255 | 12/1982 | (JP) . |
| 57-208256 | 12/1982 | (JP) . |
| 58-8658 | 1/1983 | (JP) . |
| 61-154947 | 7/1986 | (JP) . |
| 62-264975 | 11/1987 | (JP) . |
| 4-10940 | 1/1992 | (JP) . |
| 4-10941 | 1/1992 | (JP) . |
| 4-10942 | 1/1992 | (JP) . |
| 6-286149 | 10/1994 | (JP) . |

* cited by examiner

*Primary Examiner*—Gregory Mills
*Assistant Examiner*—Sylvia R. MacArthur
(74) *Attorney, Agent, or Firm*—Fitzpatrick, Cella, Harper & Scinto

(57) ABSTRACT

A method for manufacturing ink jet recording heads includes the steps of forming a film of a first inorganic material in the form of ink flow path pattern using a soluble first inorganic material on the substrate having ink-discharge, pressure-generating elements formed thereon, forming a film of a second inorganic material becoming ink flow walls on the film of the first inorganic material using the second inorganic material, forming ink-discharge openings on the film of the second inorganic material above the ink-discharge, pressure-generating elements, and eluting the film of the first inorganic material. With this method, it becomes possible to set the ink-discharge, pressure-generating elements and the ink-discharge openings (ports) of each head with extremely high precision in a shorter distance with a good reproducibility to record images with higher quality and without any deformation of the head due to the applied heat, while providing a good resistance to ink and erosion, as well as a higher dimensional precision and reliability that may be affected otherwise by swelling or the like.

8 Claims, 19 Drawing Sheets

METHOD FOR MANUFACTURING INK JET RECORDING HEADS

BACKGROUND OF THE INVENTION

1. Field of the Invention

The present invention relates to a method for manufacturing ink jet recording heads. More particularly, the invention relates to a method for manufacturing ink jet recording heads, that is capable of setting the ink-discharge, pressure-generating elements and the ink-discharge openings (ports) of each head with extremely high precision in a shorter distance with a good reproducibility to record images in higher quality without any deformation of the head due to the applied heat, while providing a good resistance to ink and erosion, as well as a higher dimensional precision and reliability that may be affected otherwise by swelling or the like.

2. Related Background Art

An ink jet recording head applicable to the ink jet recording method (liquid jet recording method) is generally provided with fine recording-liquid discharge openings (ports), liquid-flow paths, and liquid-discharge, energy-generating portions, each arranged on a part of each liquid-flow path. Then, to obtain high quality images using an ink jet recording head of this kind, it is desirable to discharge small droplets of the recording liquid from the respective discharge openings (ports) each in an equal volume always at the same discharge speed. In this respect, there has been disclosed in the specifications of Japanese Patent Application Laid-Open Nos. 4-10940 to 4-10942, a method for discharging ink droplets in such a manner that driving signals are applied to the ink-discharge pressure-generating elements (electrothermal transducing elements) in accordance with recording information to cause the electrothermal transducing elements to generate thermal energy, which provided a rapid temperature rise to ink beyond its nuclear boiling point, thus forming bubbles in the ink to discharge ink droplets by communicating these bubbles with the air outside.

As an ink jet recording head that may implement such method, it is preferable to make the distance between each of the electrothermal transducing elements and discharge openings (ports) (hereinafter referred to as the "OH distance") as small as possible. Also, for this method, the discharge volume is determined almost only by the OH distance. Therefore, it is necessary to set the OH distance exactly together with a good reproducibility.

Conventionally, as a method for manufacturing ink jet recording heads, there is a method such as disclosed in the specifications of Japanese Patent Application Laid-Open Nos. 57-208255, and 57-208256, wherein the nozzles formed by ink-flow paths and discharge openings (ports) are patterned by the use of photosensitive resin material on the substrate having ink-discharge, pressure-generating elements formed on it, and then, a glass plate or the like is bonded to cover the substrate, or a method such as disclosed in the specifications of Japanese Patent Application Laid-Open No. 61-154947, wherein the ink flow path pattern is formed by soluble resin, and this pattern is covered with epoxy resin or the like to harden it, and then, after the substrate is cut off, the pattern formed by the soluble resin is removed by elution. However, any one of these methods is arranged to be adoptable for manufacturing only an ink jet recording head whose discharge direction is different from (almost perpendicular to) the development direction of bubbles. Then, for a head of this type, it is arranged to set the distance between the ink-discharge, pressure generating elements and the discharge openings (ports) by cutting off each of the substrates. As a result, the cutting precision becomes an extremely important factor for controlling the distance between them. Since, however, the cutting is executed by the use of a dicing saw or some other mechanical means in general, it is difficult to carry out the setting performance with an extremely high precision.

Also, as a method for manufacturing an ink jet recording head whose type is such that the development direction of bubbles is almost the same as that of the discharges, there is a method disclosed in the specification of Japanese Patent Application Laid-Open No. 58-8658, wherein the substrate and the dry film that becomes the orifice plate are bonded through the other patterned dry film, and then, the discharge openings (ports) are formed by means of photolithography, or a method disclosed in the specification of Japanese Patent Application Laid-Open No. 62-264975, wherein the substrate having the ink-discharge, pressure-generating elements formed on it and the orifice plate processed by electrolytic casting are bonded through dry film, among some others. Nevertheless, with any one of these methods, it is difficult to form the orifice plate thin uniformly (in a thickness of 20 $\mu$m or less, for example), and even if such thin orifice plates can be produced, it becomes extremely difficult to execute the bonding process between the substrate having the ink-discharge, pressure-generating elements on it with the thin orifice plate due to its brittleness.

In order to solve these problems, there is disclosed in Japanese Patent Application Laid-Open No. 6-286149 a method for manufacturing ink jet recording heads that is capable of setting the ink-discharge, pressure-generating elements and the discharge openings (ports) with a short distance in an extremely high precision and with a good reproducibility to record images in higher quality with such a manner that (1) after ink-flow paths are formed by the patterning by use of soluble resin on the substrate having ink-discharge, pressure-generating elements on it, (2) the solid epoxy resin containing coating resin in it is dissolved in a solvent at room temperature, which is coated on the soluble resin layer by the application of solvent coating to form the covering resin layer that may become ink-flow path walls on the soluble resin layer, and then, (3) after the ink-discharge openings (ports) are formed on the covering resin layer above the ink-discharge, pressure-generating elements, (4) the soluble resin layer is eluted for the provision of the aforesaid ink jet recording head. With this method, it is possible to shorten the processes of manufacture and obtain an inexpensive but reliable ink jet recording head.

Nevertheless, there are still problems given below for the method disclosed in the specification of Japanese Patent Application Laid-Open No. 6-286149.

(1) Since the ink-flow-path walls are usually formed with resin on the silicon substrate, deformation tends to take place due to the difference in linear expansion factors of the inorganic material and resin. As a result, a problem is encountered with respect to the mechanical characteristics of the walls thus formed.

(2) The edge portion of resin formation is often rounded. Then, the sharpness of the resultant edge thereof is often insufficient. In some cases, therefore, the dimensional precision obtained is not necessarily good enough.

(3) Resin is subjected to swelling and easy peeling off. In some cases, therefore, its reliability is not necessarily good enough.

SUMMARY OF THE INVENTION

The present invention is designed with a view to solving these problems encountered in the conventional art. It is an object of the invention to provide a method for manufacturing ink jet recording heads that is capable of setting the ink-discharge, pressure-generating elements and the ink-discharge openings (ports) of each head with extremely high precision in a shorter distance with a good reproducibility to record images with higher quality and without any deformation of the head due to the applied heat, while providing a good resistance to ink and erosion, as well as a higher dimensional precision and reliability that may be affected otherwise by swelling or the like.

Also, with this method, it is possible to shorten the processes of manufacture as in the method disclosed in the specification of Japanese Patent Application Laid-Open No. 6-286149, and to obtain a highly reliable ink jet recording head at lower costs of manufacture.

In order to achieve the objects of the present invention, the method for manufacturing ink jet recording heads comprises the steps of forming a film of a first inorganic material in the form of an ink-flow-path pattern using the soluble first inorganic material on the substrate having ink-discharge, pressure-generating elements formed thereon; forming a film of a second inorganic material becoming ink-flow walls on the film of the first inorganic material using the second inorganic material; forming ink-discharge openings on the film of the second inorganic material above the ink-discharge, pressure-generating elements; and eluting the film of the first inorganic material.

Also, the method of the present invention for manufacturing an ink jet recording head, which is provided with ink-discharge openings for discharging ink, ink-flow paths communicating with the ink-discharge openings for supplying ink to the ink-discharge openings, heat-generating elements arranged in the ink-flow paths for creating bubbles in liquid distributed in the ink-flow paths, and supply openings for supplying liquid to the ink-flow paths, comprises the steps of forming silicon oxide film on the surface of an elemental substrate having Si as the base thereof with at least the heat-generating elements formed on the surface thereof; forming on the surface of the elemental substrate the portions covered with the silicon oxide film, and the portions having the surface of the elemental substrate exposed by selectively removing the silicon oxide film on the surface of the elemental substrate; forming a polycrystal Si layer on the portions covered by the silicon oxide film, at the same time, forming a monocrystal Si layer on the portions having the surface of the elemental substrate exposed by developing Si epitaxially in a desired thickness all over the surface of the elemental substrate including the portions covered by the silicon oxide film; forming SiN film all over the surface of the monocrystal Si layer and the polycrystal Si layer in a desired thickness; forming the ink-discharge openings on the SiN film on the polycrystal Si layer; removing the portions covered with the silicon oxide film formed on the surface of the elemental substrate by forming the through holes becoming the supply openings from the reverse side of the elemental substrate; and forming the ink-flow paths by removing only the polycrystal Si layer.

Also, the method of the present invention for manufacturing an ink jet recording head, which is provided with ink-discharge openings for discharging ink, ink-flow paths communicating with the ink-discharge openings for supplying ink to the ink-discharge openings, heat-generating elements arranged in the ink-flow paths for creating bubbles in liquid distributed in the ink flow paths, and supply openings for supplying liquid to the ink flow paths, comprises the steps of forming silicon oxide film on the surface of an elemental substrate having Si as the base thereof with at least the heat-generating elements formed on the surface thereof; forming on the surface of side portions of the elemental substrate the portions covered with the silicon oxide film, at the same time, exposing the surface of the elemental substrate other than the side portions by selectively removing the silicon oxide film on the surface of the elemental substrate; forming a polycrystal Si layer on the portions covered by the silicon oxide film, at the same time, forming a monocrystal Si layer on the portions having the surface of the elemental substrate exposed by developing Si epitaxially in a desired thickness all over the surface of the elemental substrate including the portions covered by the silicon oxide film; forming SiN film all over the surface of the monocrystal Si layer and the polycrystal Si layer in a desired thickness; forming the ink-discharge openings on the SiN film on the polycrystal Si layer; removing the portions covered with the silicon oxide film formed on the side portions of the elemental substrate; and forming the ink-flow paths and the supply openings by removing only the polycrystal Si layer.

Other objectives and advantages besides those discussed above will be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 1A is a plan view and FIG. 1B is a cross-sectional view taken along line 1B—1B in FIG. 1A.

FIG. 3A is a plan view and FIG. 3B is a cross-sectional view taken along line 3B—3B in FIG. 3A.

FIG. 5A is a plan view and FIG. 5B is a cross-sectional view taken along line 5B—5B in FIG. 5A.

FIG. 7A is a plan view and FIG. 7B is a cross-sectional view taken along line 7B—7B in FIG. 7A.

DETAILED DESCRIPTION OF THE PREFERRED EMBODIMENTS

Figure 1A:
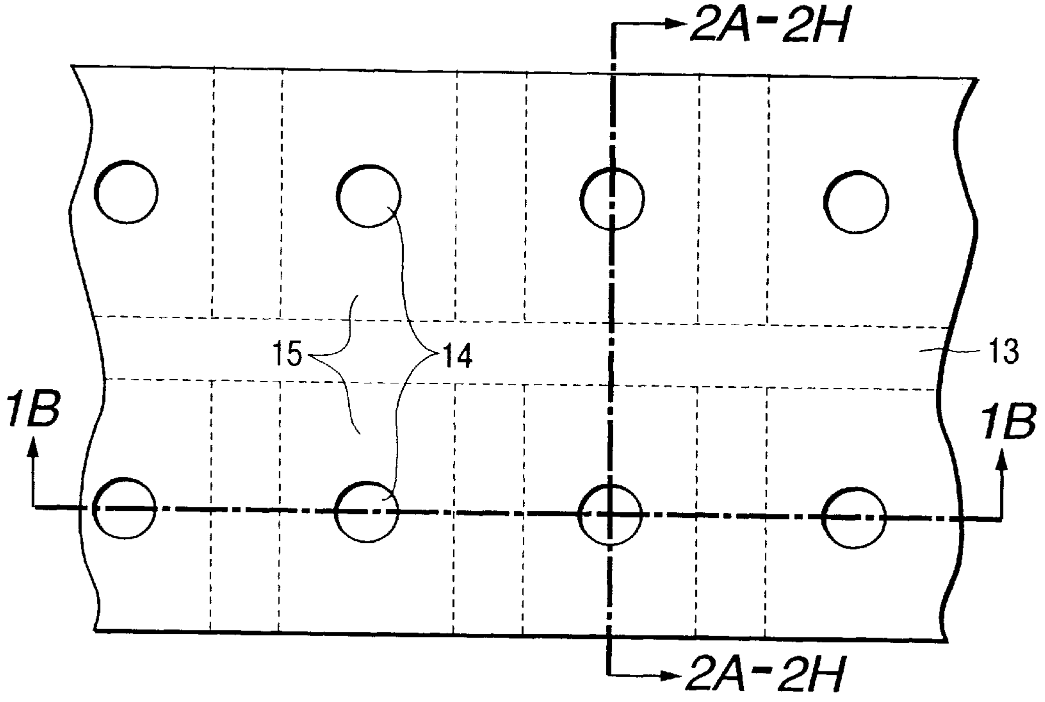
FIGS. 1A and 1B are views that illustrate the discharge-opening surface of an ink jet recording head in accordance with a first embodiment of the present invention.

In accordance with the present invention, it is preferable to use a first inorganic material that is easier to be dissolved than a second inorganic material by the solvent (etching solution) used at the time of elution, and that is capable of being eluted later, and eluted by the injection of alkaline ink even when there is the residue of elution (etching residue). For such material, it is preferable to use PSG (Phospho-Silicate Glass), BPSG (Boron Phospho-Silicate Glass), silicon oxide, or the like, for example. For a material of the kind, it is possible to remove it by elution using hydrofluoric acid in the later process. For the first inorganic material, it is particularly preferable to use the PSG as the first inorganic material, because it has a higher etching rate against the buffered hydrofluoric acid. Also, with attention given to the damage that may be brought to the inorganic material because of the solvent used for elution, it is preferable to use Al as the first inorganic material, and as the solvent, it is preferable to use the phosphric acid or hydrochloric acid, which is used at the room temperature.

Also, for the second inorganic material in accordance with the present invention, it is usual to adopt the material that is not easily soluble by the solvent (etching solution) used for elution as compared with the first inorganic material, while having a good chemical stability, such as resistance to ink, as well as a good physical property, such as a mechanical strength sufficiently good to satisfy its use as the discharge-opening surface. For such material, it is preferable to adopt the silicon oxide that is used for the general semiconductor manufacture.

In accordance with the present invention, it is possible to obtain the following effects if PSG (Phospho-Silicate Glass), BPSG (Boron Phospho-Silicate Glass), or silicon oxide is used for the first inorganic material, and silicon oxide is used for the second inorganic material:

(1) Resistance to erosion, such as to ink, becomes excellent.

(2) Difference in thermal expansion becomes smaller, and the problem of thermal deformation is eliminated, because silicon substrate is usually used as the one that is adopted for the present invention.

(3) The dimensional precision and positional precision are excellent, because it becomes possible to execute the photolithographic process to form discharge openings (ports) on the silicon nitride film.

(4) Reliability becomes higher because there is no swelling taking place due to ink.

(5) It becomes possible to execute all the formation processes by means of photolithography, and the mechanical assembling is possible under a cleaner environment. As a result, the problem of dust particles is eliminated.

(6) There is no possibility that the surface of ink discharge pressure element, such as electrothermal converting means, is contaminated, because no resin is used, nor is any organic solvent used here.

(7) It becomes possible to form the discharge openings (ports) perpendicular or in the reversely tapered configuration.

(8) Heat treatment is possible at a temperature of 300° C. to 400° C. after the formation of discharge openings (ports). As a result, the water-repellent treatment is given uniformly to the surface of discharge openings (ports) by means of plasmic polymerization.

(9) The resistance to abrasion becomes higher against wiping at the time of head recovery to make the durability of the head higher, because the silicon nitride film is hard.

Also, when Al is used as the first inorganic material in accordance with the present invention, the following effects are further obtainable:

(1) In a case where the silicon nitride is used as the second inorganic material, which is not easily soluble against the etching solution, while having a high chemical stability, such as resistance to ink, as well as having a good physical property, such as the mechanical strength that may satisfy its use as the discharge-opening surface, the etching selection ratio is as large as 20:1 if $CF_4$, $C_2F_6$, $C_3F_8$, $SF_6$, or some other gas is used for etching the orifice portion. As a result, it becomes possible to produce the etching-stopper effect (the prevention of any possible damage to the base material).

(2) Also, in the formation of the orifice portion, there is no under cut configuration brought about by the base-material etching.

Also, if the structure is arranged so that the main component of the material of the liquid-flow-path member, which is provided with the discharge openings (ports) and liquid-flow paths, is Si as the elemental substrate whose basic material is also Si, there is no difference that may take place in the thermal expansion factors of the elemental substrate and the liquid-flow path member. As a result, the close contact between the elemental substrate and the liquid-flow-path member or the relative positional precision between them is not degraded by the thermal influence exerted by the heat accumulation in the head at the time of higher speed printing. Also, with the liquid-flow-path member that can be produced by the application of the semiconductor process, the distance between the heat-generating elements and discharge openings (ports) is set with an extremely high precision with a good reproducibility. Further, since the main component of the liquid-flow-path member is Si, this member is made excellent in resistance to ink or resistance to erosion. With these advantages described above, it becomes possible to perform highly reliable recording with higher quality.

(First Embodiment)

Figure 1B:
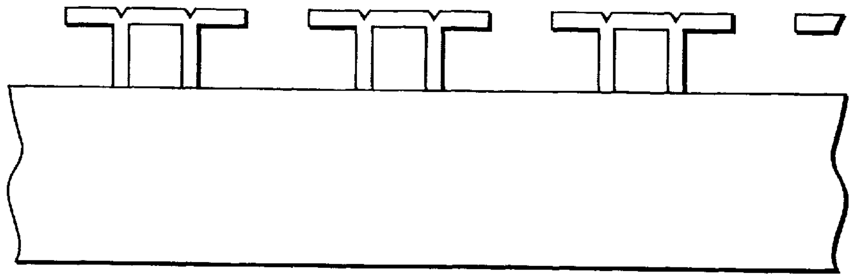

FIGS. 1A and 1B are views illustrating a side-shooter-type ink jet recording head manufactured in accordance with a first embodiment of the present invention; FIG. 1A is a plan view; and FIG. 1B is a cross-sectional view taken along line 1B—1B in FIG. 1A. Here, discharge openings (ports) 14 are formed on the discharge-opening surface 15 formed by silicon nitride. FIGS. 2A to 2H are views that illustrate the process of manufacture in accordance with the present embodiment, that correspond to the section taken along lines 2A—2A to 2H—2H in FIG. 1A.

Figure 2A:
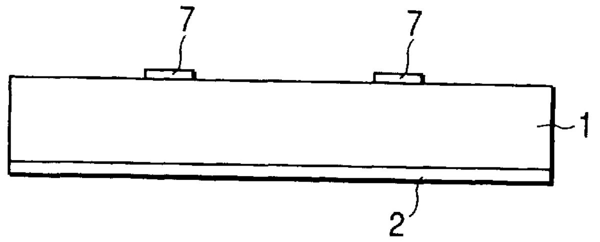
FIGS. 2A, 2B, 2C, 2D, 2E, 2F, 2G and 2H are views that illustrate the method for manufacturing the ink jet recording head of the first embodiment of the present invention.

As shown in FIG. 2A, the electrothermal converting means 7 (heaters formed by $HfB_2$) are, at first, formed as the discharge energy-generating devices. Then, on the bottom end of a silicon substrate 1 an $SiO_2$ film 2 is formed in a thickness of approximately 2 $\mu$m at a temperature of 400° C. by the application of the CVD method. On the silicon substrate, there are formed the transducing devices and the wiring that arranges the electric connection therefor, and also, a cavitation-proof film as the protection film that protects them.

Figure 2B:
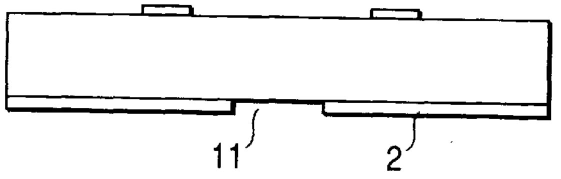

As shown in FIG. 2B, resist is coated on the $SiO_2$ film 2. Then, after exposure and development, the opening 11 is formed by means of dry or wet etching. The $SiO_2$ film 2 serves as a mask when a through hole 13 is made later. The through hole 13 is formed from the opening 11. For the etching of the $SiO_2$ film 2, the reactive ion etching or the plasma etching is performed with $CF_4$ as the etching gas if the dry etching is adopted. If wet etching is adopted, buffered hydrofluoric acid is used.

Figure 2C:
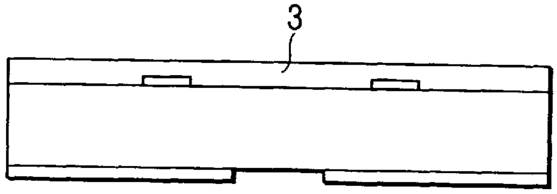

Then, as shown in FIG. 2C, by the application of the CVD method, PSG (Phospho-Silicate Glass) film 3 is formed in a thickness of approximately 20 $\mu$m on the upper end side of the substrate at a temperature of 350° C.

Figure 2D:
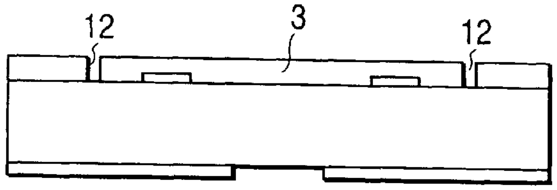

Subsequently, as shown in FIG. 2D, the PSG film 3 is processed to form the specific pattern of flow paths. Here, it is preferable to adopt the dry etching using resist for the PSG film processing, because with this etching, the $SiO_2$ film on the bottom end is not subjected to any damage that may be caused otherwise.

Figure 2E:
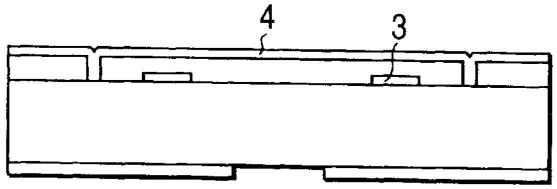

Then, as shown in FIG. 2E, the silicon nitride film 3 is formed in a thickness of approximately 5 $\mu$m on the PSG film 3, which is configured in the form of flow-path pattern, by the application of the CVD method at a temperature of 400° C. At this juncture, the opening 12 is also buried with the silicon nitride film.

The thickness of the silicon nitride film, which is formed here, regulates the thickness of the discharge openings (ports), and the thickness of the PSG film that is formed earlier regulates each gap of ink flow paths. Therefore, these thicknesses may exert a great influence on the ink-discharge characteristics of the ink-jet performance. Each of them should be determined appropriately depending on the characteristics as required.

Figure 2F:
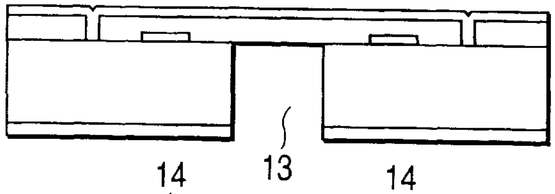

Then, as shown in FIG. 2F, the $SiO_2$ film 2 the contour of that has been formed is used as a mask. Then, with this mask, the through hole 13 is formed on the silicon substrate 1 as the ink-supply opening. Here, any method may be adoptable for the formation of the through hole, but it is preferable to use the ICP (inductive coupling plasma) etching with $CF_4$ and oxygen as the etching gas, because with this etching, the substrate is not subjected to any electrical damages, and also, formation is possible at a lower temperature.

Figure 2G:
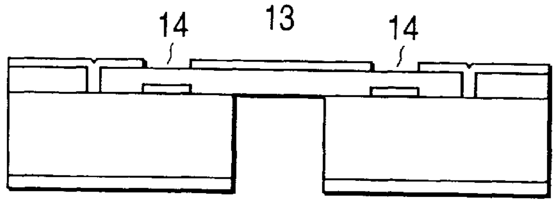

Now, as shown in FIG. 2G, using resist, the discharge openings (ports) 14 are formed on the silicon nitride film 4 by the application of dry etching. Here, by the use of the highly anisotropic reactive ion etching, the additional effect is produced as given below.

In other words, with the conventional structure of the side-shooter-type ink jet head, the edge portion thereof tends to be rounded because the discharge-opening portion is formed by resin, and the discharge characteristics may be affected in some cases. In order to avoid this possibility, an orifice plate, which is formed by means of electrocasting, is bonded to such an opening portion. In accordance with the present embodiment, however, the discharge openings (ports) 14 are formed on the silicon nitride film 4 formed by the application of the reactive ion etching, hence making it possible to form the edges of the discharge openings (ports) sharp.

Further, with the silicon nitride film that has been multi-layered, the etching rate is made higher on the lower part or the composition may be changed gradually. In this manner, it becomes possible to provide the reversed taper configuration to make the exit of each of the discharge openings (ports) narrower, while the interior thereof is made wider. With the reversely tapered discharge openings (ports), printing accuracy is further enhanced.

Also, with good edge configuration of each of the discharge openings (ports), it becomes possible to form a water-repellent film only on the surface thereof when the water-repellent film should be formed by the application of plasmic polymerization. Also, when water-repellency should be produced by implanting ion on the surface of the silicon nitride film, there is no possibility that the water-repellency is provided for the interior of each discharge opening (port). As a result, the flight direction of ink is not caused to be deviated, thus making it possible to print with higher precision.

Figure 2H:
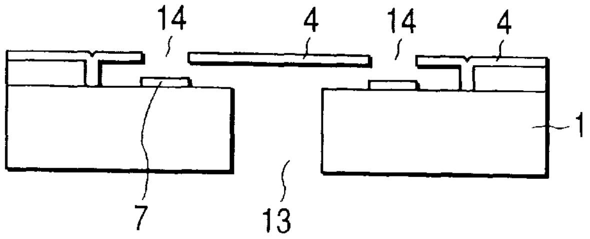

Then, as shown in FIG. 2H, using buffered hydrofluoric acid, the PSG film 3 is removed by elution from the discharge openings (ports) and the through holes as well.

After that, the water-repellent film that contains Si is formed on the discharge opening surface by the application of the plasmic polymerization. Then, on the bottom end of the Si substrate 1, an ink supply member (not shown) is bonded to complete an ink jet recording head.

(Second Embodiment)

Figure 3A:
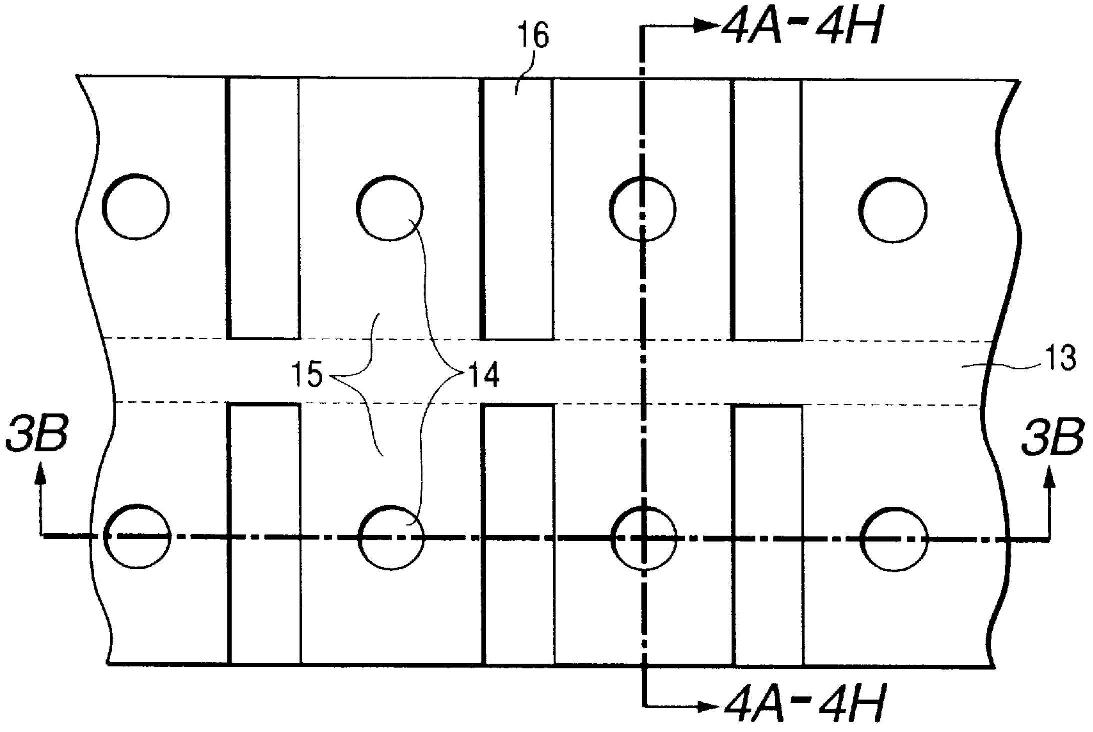
FIGS. 3A and 3B are views that illustrate the discharge-opening surface of an ink jet recording head in accordance with a second embodiment of the present invention.
Figure 3B:
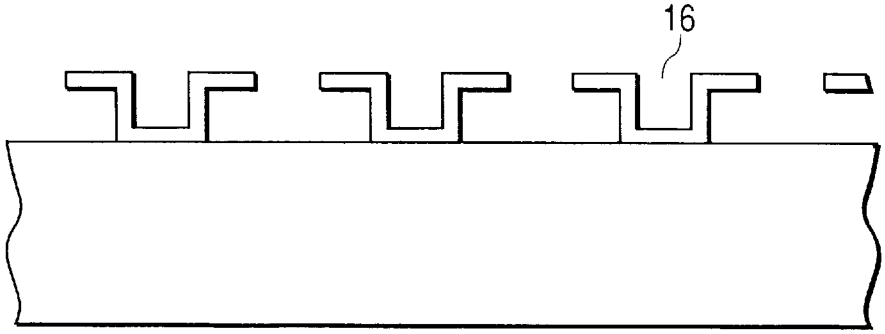

In accordance with the first embodiment, the PSG base is formed in order to eliminate steps on the discharge-opening surface. As shown in FIGS. 3A and 3B, however, grooves 16 are arranged between discharge openings (ports) to enable ink to escape in accordance with the present embodiment. FIGS. 3A and 3B are views that illustrate the discharge-opening surface of an ink jet recording head in accordance with a second embodiment of the present invention; FIG. 3A is a plan view and FIG. 3B is a cross-sectional view taken along line 3B—3B in FIG. 3A. FIGS. 4A to 4H are cross-sectional views taken along lines 4A—4A to 4H—4H, that illustrate the process for manufacturing the ink jet recording head of the second embodiment of the present invention.

This manufacturing process is the same as that of the first embodiment except for the difference in pattern upon forming the flow path by processing the PSG film 3. FIGS. 4A to 4H correspond to FIGS. 2A to 2H.

Figure 4A:
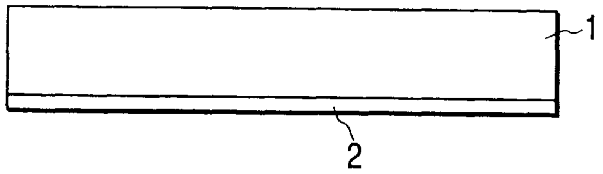
FIGS. 4A, 4B, 4C, 4D, 4E, 4F, 4G and 4H are views that illustrate the method for manufacturing the ink jet recording head of the second embodiment of the present invention.
Figure 4B:
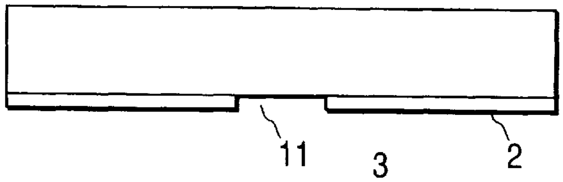
Figure 4C:
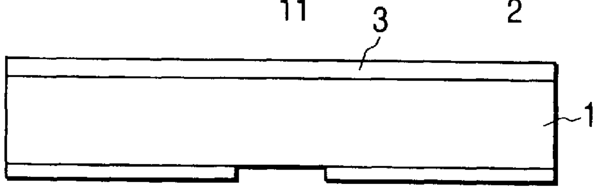

As shown in FIGS. 4A to 4C, the electrothermal converting means 7 (the heaters formed by $HfB_2$ which are not shown in FIGS. 4A to 4C), that serve as the discharge-energy-generating devices are formed on the silicon substrate 1 in the same manner as the first embodiment, and then, after the $SiO_2$ film 2 is formed on the bottom end thereof in a thickness of approximately 2 $\mu$m, the opening 11 is formed. Further, on the upper end side of the substrate, the PSG film 3 is formed.

Figure 4D:
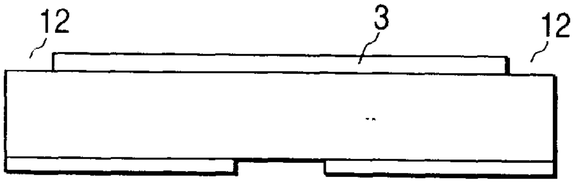

Then, as shown in FIG. 4D, the specific flow-path pattern is formed. In accordance with the present embodiment, each of the openings 12 is formed larger.

Figure 4E:
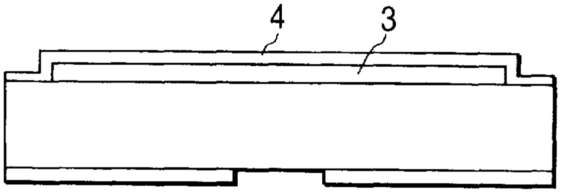

Subsequently, as shown in FIG. 4E, the silicon nitride film 4 is formed on the PSG film 3, which is configured in the form of flow-path pattern, hence the grooves of silicon nitride film being formed on each portion of the openings 12.

Figure 4F:
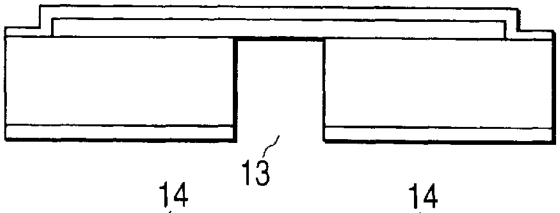
Figure 4G:
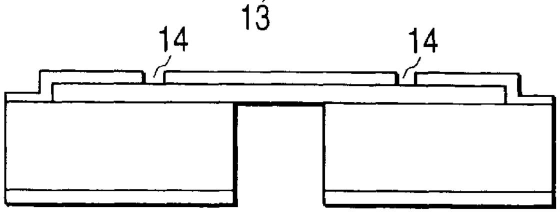
Figure 4H:
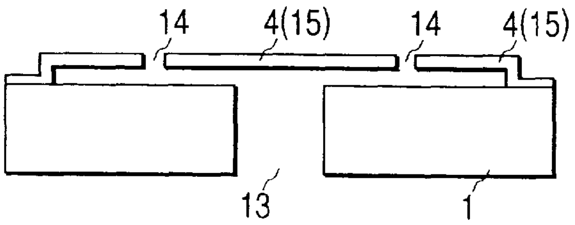

After that, exactly in the same manner as the first embodiment, the through hole 13 is formed as the ink-supply opening as shown in FIGS. 4F to 4H. Then, after the discharge openings (ports) 14 are formed by the application of dry etching using resist, the PSG film 3 is removed by elution from the discharge openings (ports) 14 and the through hole 13 using buffered hydrofluoric acid.

Subsequently, an ink jet recording head is completed in the same manner as the first embodiment.

(Third Embodiment)

Figure 5A:
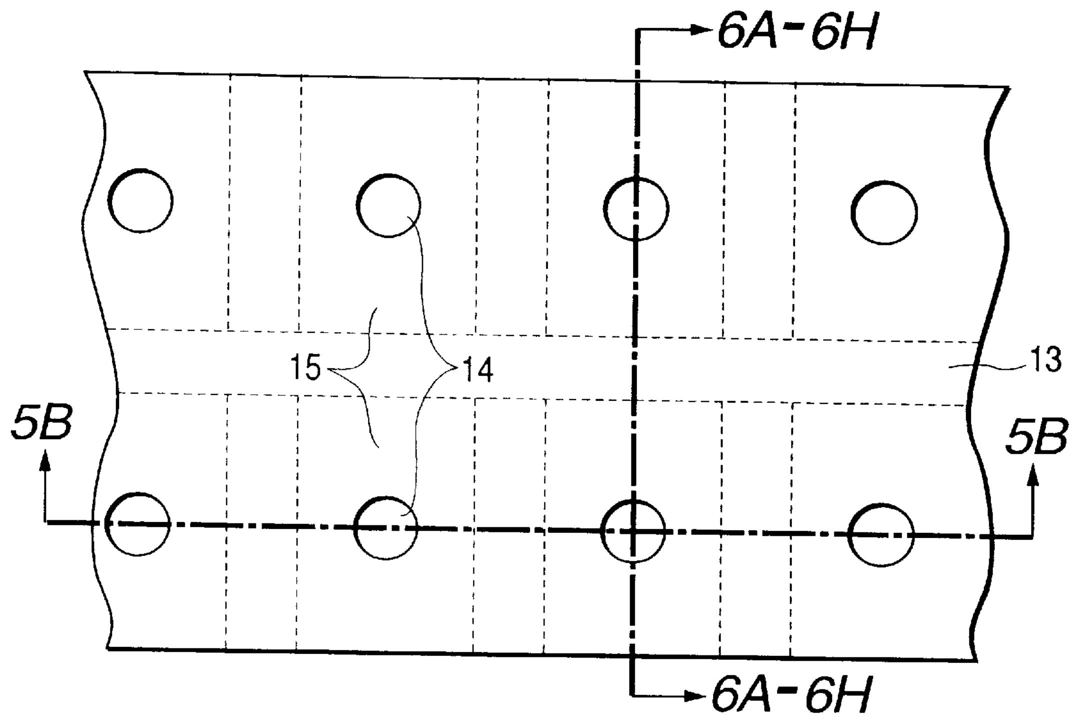
FIGS. 5A and 5B are views that illustrate the discharge-opening surface of an ink jet recording head in accordance with a third embodiment of the present invention.
Figure 5B:
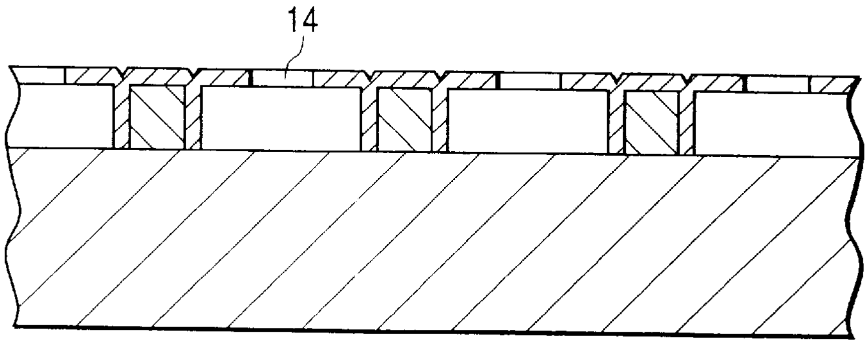

FIGS. 5A and 5B are views that illustrate the side-shooter-type ink jet recording head manufactured in accordance with the present embodiment of the present invention; FIG. 5A is a plan view and FIG. 5B is a cross-sectional view taken along line 5B—5B in FIG. 5A. Here, the discharge openings (ports) 14 are formed on the discharge-opening surface 15 formed by silicon nitride. FIGS. 6A to 6H are views which illustrate the method for manufacturing the ink jet recording head of the present embodiment corresponding to the section taken along line 6A—6A to 6H—6H in FIG. 5A.

Figure 6A:
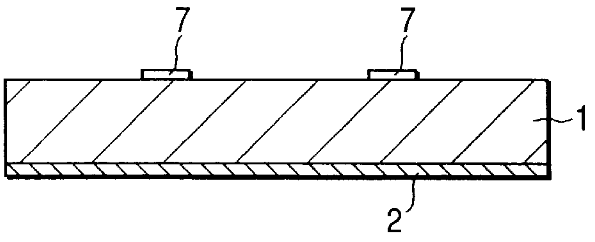
FIGS. 6A, 6B, 6C, 6D, 6E, 6F, 6G and 6H are views that illustrate the method for manufacturing the ink jet recording head of the third embodiment of the present invention.

As shown in FIG. 6A, the electrothermal converting means 7 (heaters formed by $TaN_2$) are, at first, formed as the discharge-energy-generating devices. Then, on the bottom end of a silicon substrate 1 an $SiO_2$ film 2 is formed in a thickness of approximately 2 $\mu$m at a temperature of 400° C. by the application of the CVD method. On the silicon substrate, there are formed the transducing devices and the wiring that arranges the electric connection therefor, as well as a cavitation proof film as the protection film that protects them.

Figure 6B:
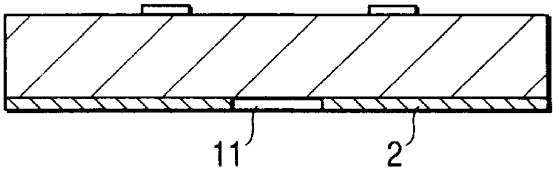

As shown in FIG. 6B, resist is coated on the $SiO_2$ film 2. Then, after exposure and development, the opening 11 is formed by means of dry or wet etching. The $SiO_2$ film 2 serves as a mask when a through hole 13 is made later. The through hole 13 is formed from the opening 11. For the etching of the $SiO_2$ film 2, the reactive ion etching or the plasma etching is performed with $CF_4$ as the etching gas if the dry etching is adopted. If the wet etching is adopted, buffered hydrofluoric acid is used.

Figure 6C:
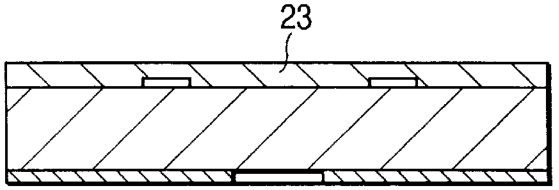

Then, as shown in FIG. 6C, Al film 23 is formed on the upper end side of the substrate 1 by the sputtering or vapor deposition in a thickness of approximately 10 $\mu$m.

Figure 6D:
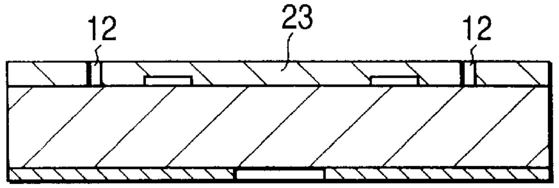

After that, as shown in FIG. 6D, the Al film 23 is processed to form the specific flow-path pattern. Here, it is preferable to process the Al film by the wet etching using resist, because then the lower end of the $SiO_2$ film 2 is not damaged.

Figure 6E:
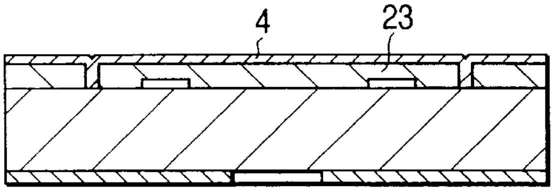

Subsequently, as shown in FIG. 6E, the silicon nitride film 4 is formed in a thickness of approximately 10 $\mu$m on the Al film 23, which is configured in the form of flow-path pattern, by the application of the CVD method at a temperature of 400° C. At this juncture, the opening 12 is also buried with the silicon nitride film 4.

The thickness of the silicon nitride film 4 that is formed here regulates the thickness of the discharge openings (ports), and the thickness of the Al film 3 that is formed earlier regulates each gap of ink flow paths. Therefore, these thicknesses may exert a great influence on the ink-discharge characteristics of the ink jet performance. Each of them should be determined appropriately depending on the characteristics as required.

Figure 6F:
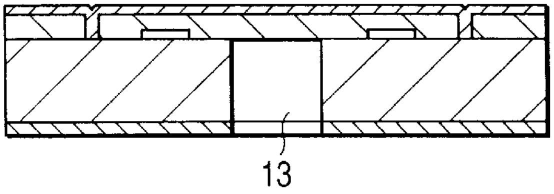

Then, as shown in FIG. 6F, the $SiO_2$ film 2 the contour of which has been formed is used as a mask. Then, with this mask, the through hole 13 is formed on the silicon substrate 1 as the ink-supply opening. Here, any method may be adoptable for the formation of the through hole 13, but it is preferable to use the ICP (inductive coupling plasma) etching with $CF_4$, $C_2F_6$, $C_3F_8$, $SF_6$, or some other gas and oxygen as the etching gas, because with this etching, the substrate is not subjected to any electrical damages, and also, the formation is possible at a lower temperature.

Figure 6G:
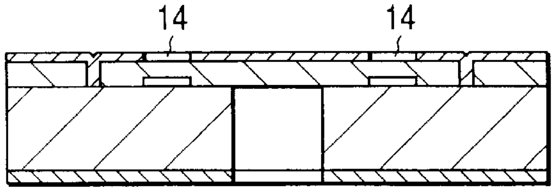

Now, as shown in FIG. 6G, using resist, the discharge openings (ports) 14 are formed on the silicon nitride film 4 by the application of dry etching. Here, by the use of the highly anisotropic reactive ion etching, such as ICP etching, the additional effect is produced as given below.

In other words, with the conventional structure of the side-shooter-type ink jet head, the edge portion thereof tends to be rounded because the discharge-opening portion is formed by resin, and the discharge characteristics may be affected in some cases. In order to avoid this possibility, an orifice plate, which is formed by means of electrocasting, is bonded to such opening portion. In accordance with the present embodiment, however, the discharge openings (ports) 14 are formed on the. silicon nitride film 4 formed by the application of the reactive ion etching, hence making it possible to form the edges of the discharge openings (ports) sharp.

Further, with the silicon nitride film that has been multi-layered, the etching rate is made higher on the lower part or the composition may be changed gradually. In this manner, it becomes possible to provide the reversed taper configuration to make the exit of each of the discharge openings (ports) narrower, while the interior thereof is made wider. With the reversely tapered discharge openings (ports), the printing accuracy is enhanced still more.

Also, with the good edge configuration of each of the discharge openings (ports), it becomes possible to form the water-repellent film only on the surface thereof when the water-repellent film should be formed by the application of plasmic polymerization. Also, when the water-repellency should be produced by implanting ion on the surface of the silicon nitride film, there is no possibility that the water-repellency is provided for the interior of each of the discharge openings (ports). As a result, the flight direction of ink is not caused to be deviated, thus making it possible to print with higher precision.

Figure 6H:
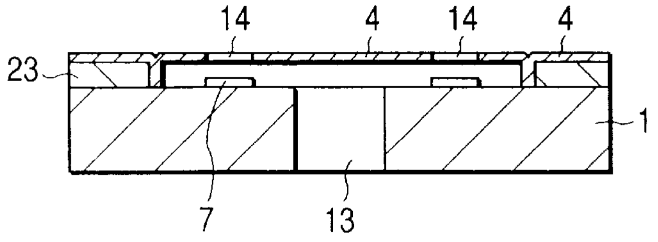

Then, as shown in FIG. 6H, using phosphoric acid or hydrochloric acid at the room temperature, the Al film 23 is removed by elution from the discharge openings (ports) and the through holes as well.

After that, the water-repellent film that contains Si is formed on the discharge-opening surface by the application of the plasmic polymerization. Then, on the bottom end of the Si substrate 1, an ink-supply member (not shown) is bonded to complete an ink jet recording head.

Also, when the discharge openings (ports) are formed, Al is used for the basic layer after the silicon nitride film has been etched. Etching comes to a stop here. This etching layer is rarely affected by etching gas. As a result, there is no influence exerted on the basic layer.

(Fourth Embodiment)

Figure 7A:
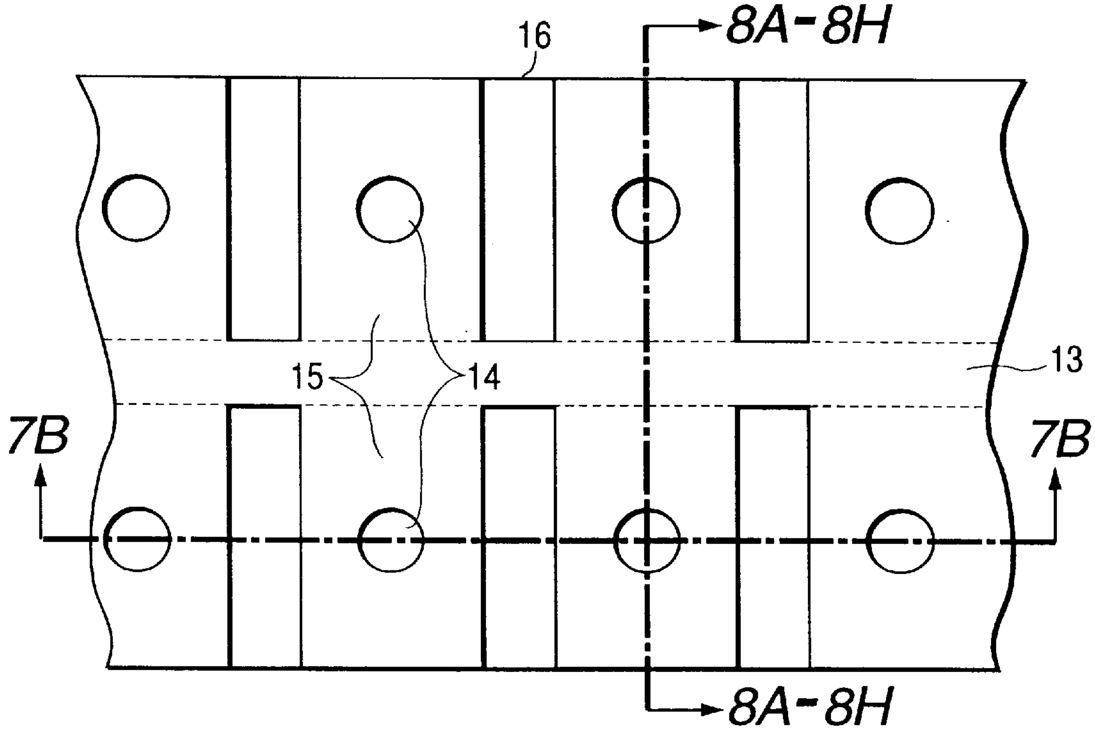
FIGS. 7A and 7B are views that illustrate the discharge-opening surface of an ink jet recording head in accordance with a fourth embodiment of the present invention.
Figure 7B:
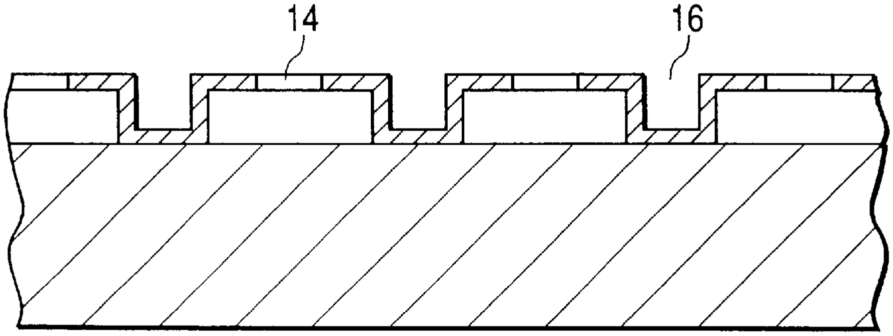

In accordance with the third embodiment, the Al base is formed in order to eliminate steps on the discharge-opening surface. As shown in FIGS. 7A and 7B, however, grooves 16 are arranged between discharge openings (ports) to enable ink to escape in accordance with the present embodiment. Here, FIG. 7A is a plan view and FIG. 7B is a cross-sectional view taken along line 7B—7B in FIG. 7A. FIGS. 8A to 8H are views that illustrate the process for manufacturing the ink jet recording head of the fourth embodiment of the present invention, which correspond to the section taken along line 8A—8A to 8H—8H in FIG. 7A.

The process of manufacture in accordance with the present embodiment is the same as that of the third embodiment with the exception of the pattern that is different from the one used for the flow-path pattern by processing the Al film 23. FIGS. 8A to 8H correspond to FIGS. 6A to 6H.

Figure 8A:
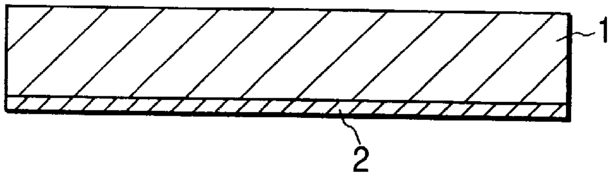
FIGS. 8A, 8B, 8C, 8D, 8E, 8F, 8G and 8H are views that illustrate the method for manufacturing the ink jet recording head of the fourth embodiment of the present invention.
Figure 8B:
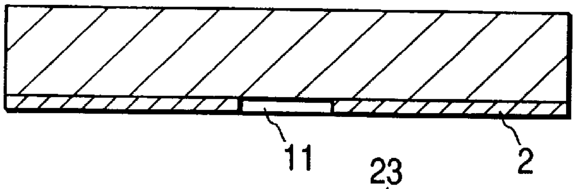
Figure 8C:
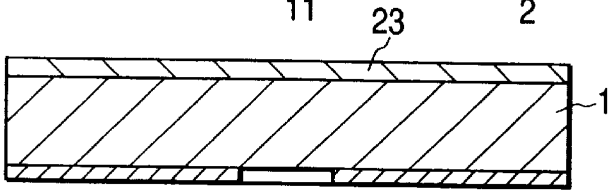

As shown in FIGS. 8A to 8C, the electrothermal converting means 7 (the heaters formed by $TaN_2$, but not shown in FIGS. 8A to 8C), which serve as the discharge-energy-generating-devices, are formed on the silicon substrate 1 in the same manner as the third embodiment, and then, after the $SiO_2$ film 2 is formed on the bottom end thereof in a thickness of approximately 2 μm, the opening 11 is formed. Further, on the upper end side of the substrate 1, the Al film 23 is formed.

Figure 8D:
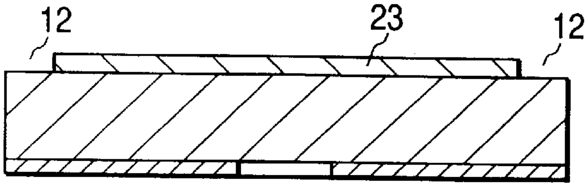

Then, as shown in FIG. 8D, the specific flow-path pattern is formed. In accordance with the present embodiment, each of the openings 12 is formed larger.

Figure 8E:
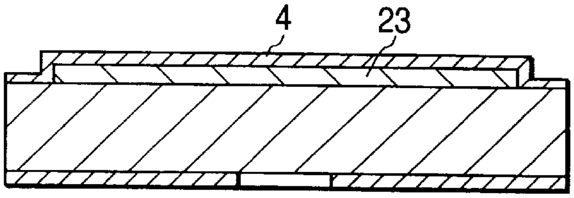

Subsequently, as shown in FIG. 8E, the silicon nitride film 4 is formed on the Al film 23, which is configured in the form of a flow-path-pattern, and hence the grooves of silicon nitride film are formed on each portion of the openings 12.

Figure 8F:
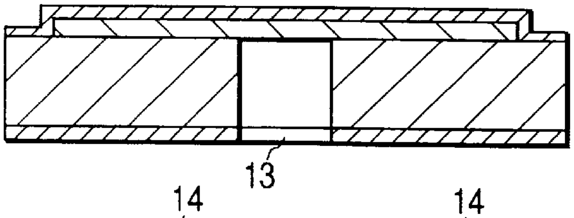
Figure 8G:
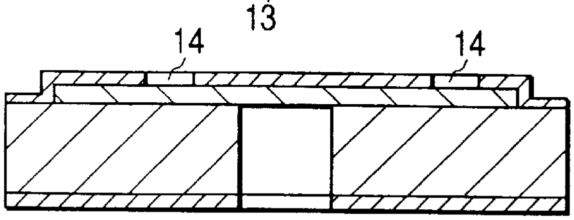
Figure 8H:
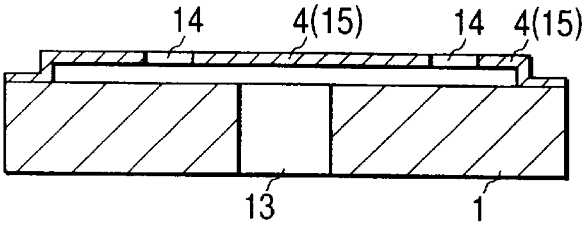

After that, exactly in the same manner as the third embodiment, the through hole 13 is formed as the ink-supply opening as shown in FIGS. 8F to 8H. Then, after the discharge openings (ports) 14 are formed by the application of dry etching using resist, the Al film 23 is removed by elution from the discharge openings (ports) 14, as well as the through hole 13, using phosphoric acid or hydrochloric acid at the room temperature.

Subsequently, an ink jet recording head is completed in the same manner as the third embodiment.

Figure 9:
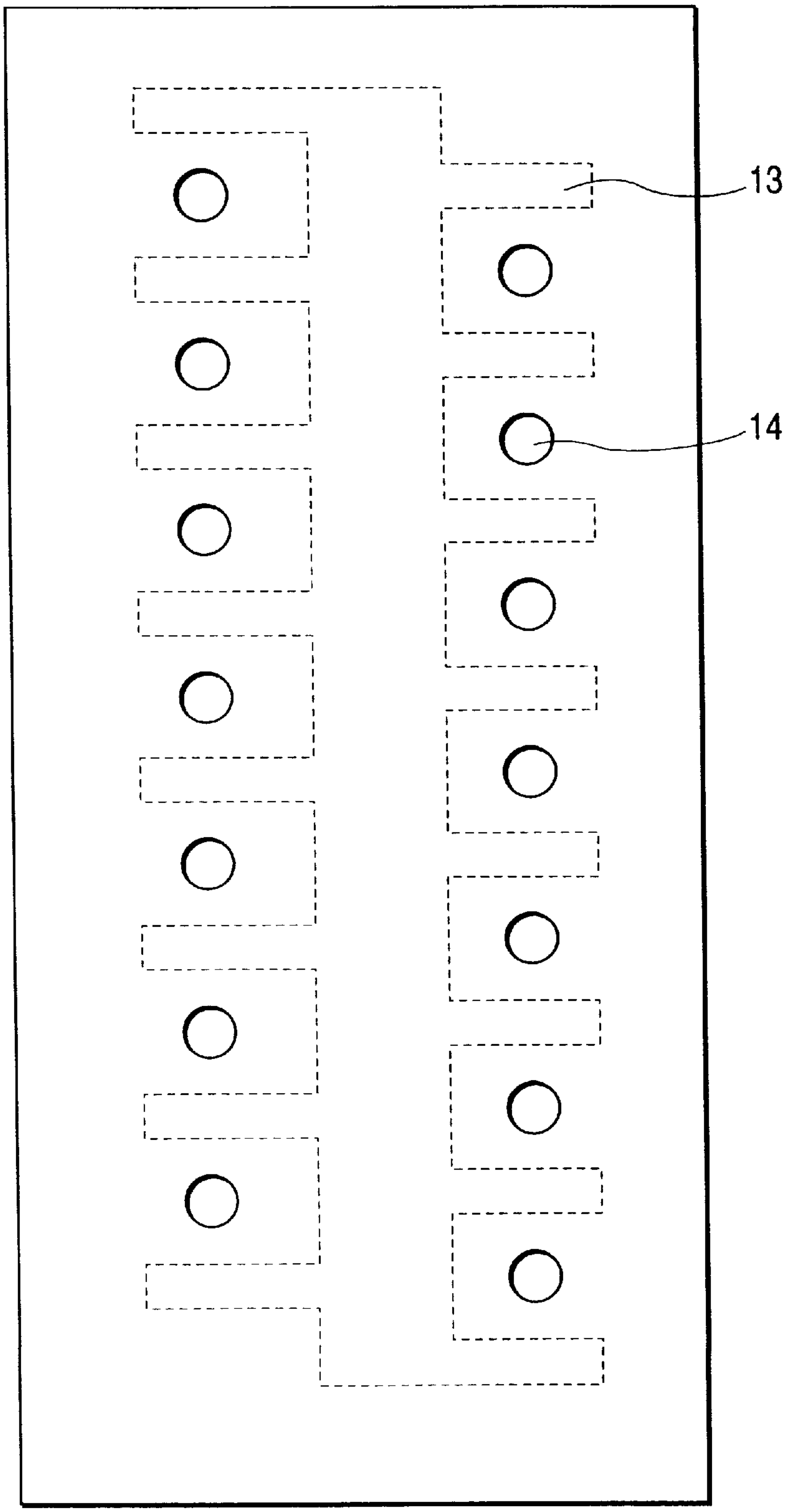
FIG. 9 is a view that shows the configuration of through holes for ink supply.
Figure 10:
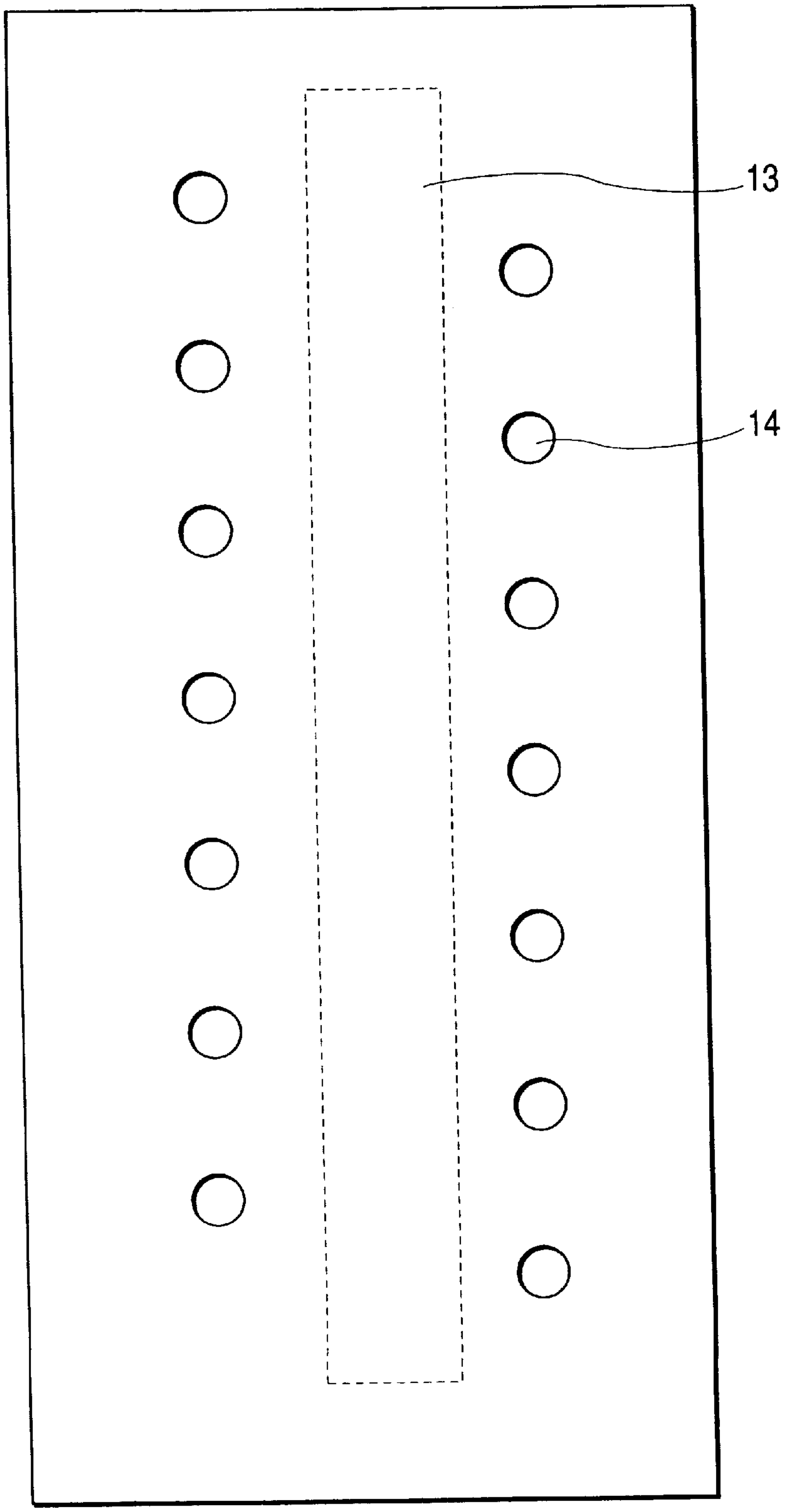
FIG. 10 is a view that shows the configuration of through holes for ink supply.

As has been described above, in accordance with the first to fourth embodiments, it is generally practiced to form the through hole 13 as shown in FIG. 10 in plan view. However, in a case where the through hole is formed by means of ICP etching as adopted for the first to fourth embodiments, it becomes possible to configure the through hole freely. Therefore, with the formation of the through hole that surrounds each of the discharge openings (ports) as shown in FIG. 9, the ink refilling condition is improved with the resultant enhancement of the discharge speeds.

(Fifth Embodiment)

Figure 11:
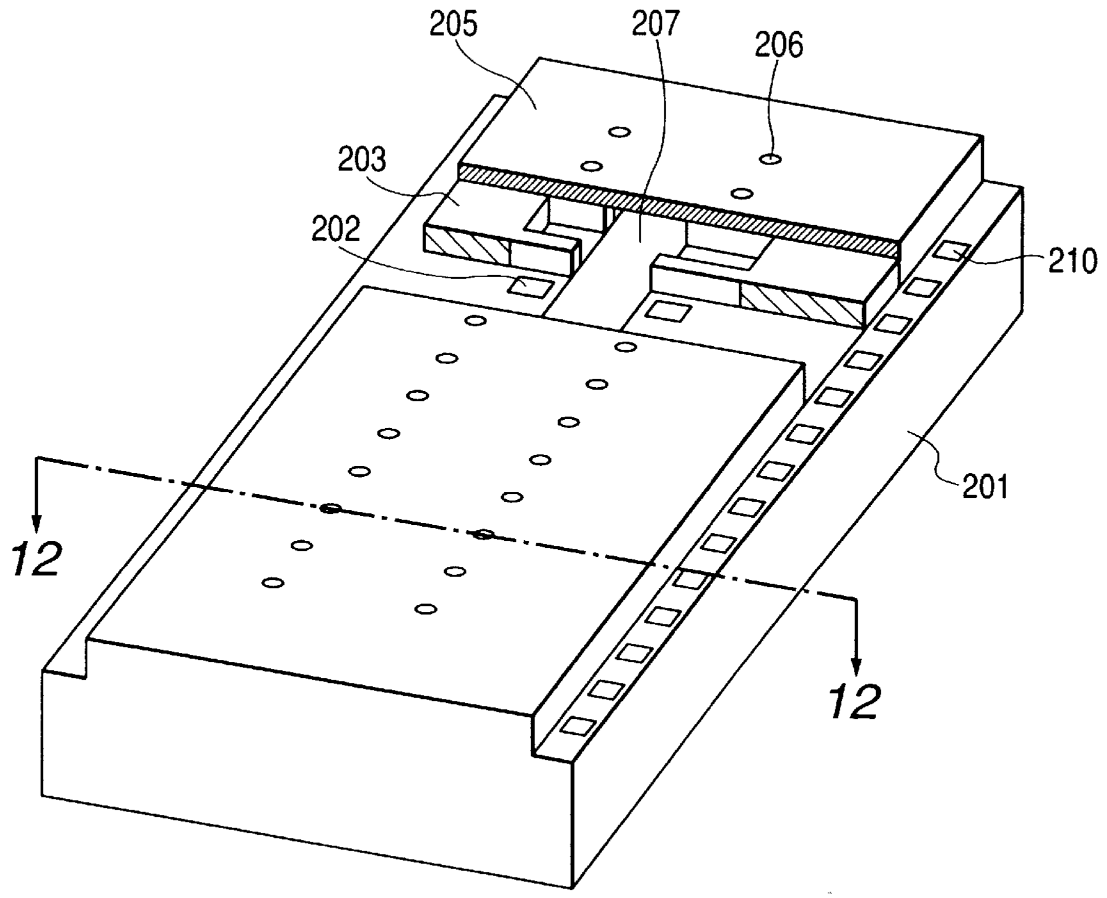
FIG. 11 is a perspective view that shows most suitably a liquid-jet head in accordance with a fifth embodiment of the present invention.
Figure 12:
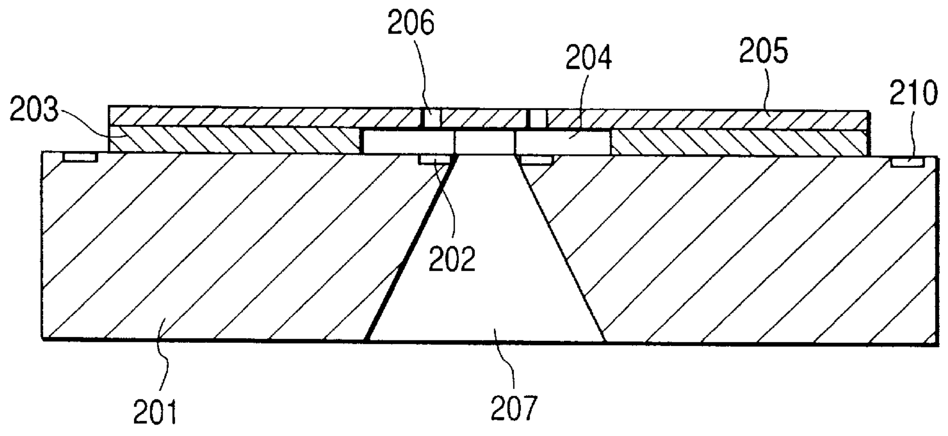
FIG. 12 is a cross-sectional view taken along line 12—12 in FIG. 11.

FIG. 11 is a perspective view that shows most suitably a liquid jet head in accordance with a fifth embodiment of the present invention. FIG. 12 is a cross-sectional view taken along line 12—12 in FIG. 11. The ink jet recording head shown in FIGS. 11 and 12 comprises an elemental substrate 201 having two lines of plural heat-generating elements 202 on the central portion of the surface of the Si substrate; liquid-flow paths (ink flow paths) 204 that distribute liquid onto each of the heat-generating elements 202; the monocrystal Si 203 that forms side walls of the liquid-flow paths 204 formed on the elemental substrate 201; the SiN film 205 formed on the monocrystal Si 203, which becomes the ceiling of the liquid-flow paths 204; a plurality of ink-discharge openings (ports) 206 drilled on the SiN film 205, which face each of the plural heat-generating elements 202, respectively; and supply opening 207 that penetrates the elemental substrate 201 for supplying liquid to the liquid-flow paths 205. In this manner, the monocrystal Si 203 and the SiN film 205 serve as the liquid-flow-path members that constitute the liquid-flow paths 204 on the elemental substrate 201. Also, the monocrystal Si 203 does not cover both side portions of the elemental substrate 201 where the electric pads 210 are formed to supply electric signals from the outside to the heat-generating elements 202.

Figure 13:
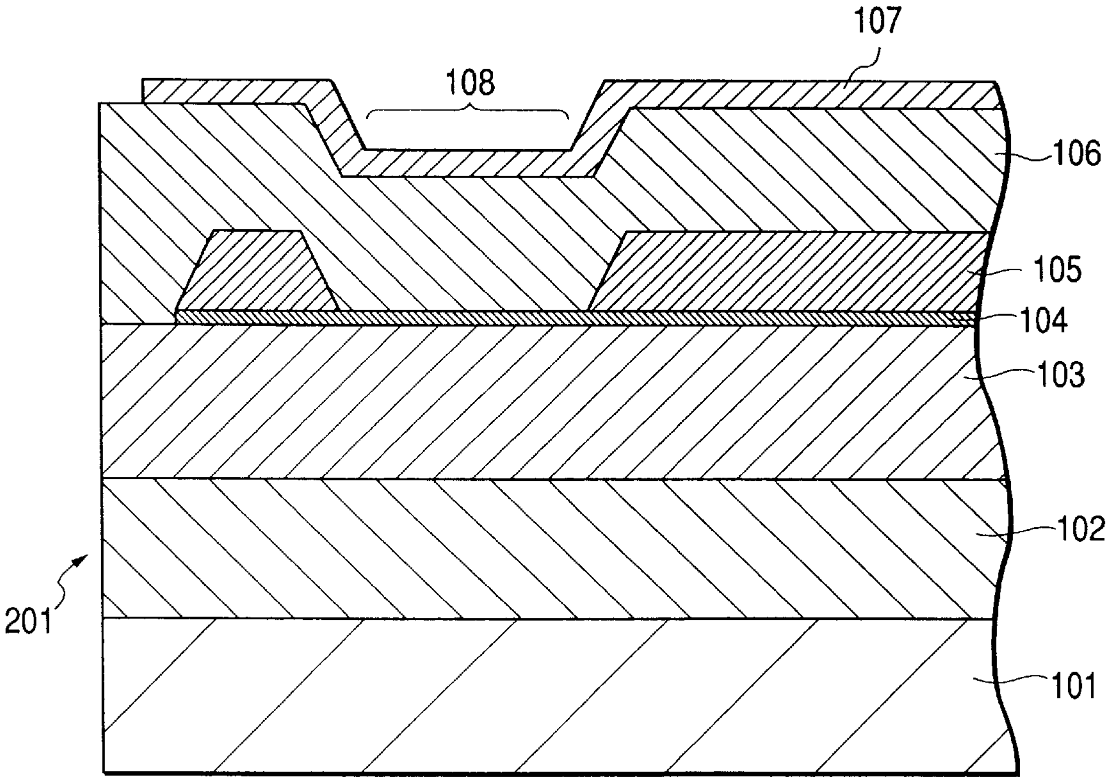
FIG. 13 is a cross-sectional view that shows the portion corresponding to the heat generating member portion (bubble creating area) of an elemental substrate represented in FIG. 11.

Now, the above-mentioned elemental substrate 201 will be described. FIG. 13 is a cross-sectional view that shows the portion corresponding to the heat-generating member (bubble generating area) of the elemental substrate 201. In FIG. 13, a reference numeral 101 designates the Si substrate and 102, the thermal oxide film ($SiO_2$ film) which serves as the heat accumulation layer. A reference numeral 103 designates the $Si_2N_4$ film that serves as the interlayer film that functions dually as the heat accumulation layer; 104 designates a resistive layer; 105 designates the Al alloy wiring such as Al, Al-Si, Al-Cu; 106 denotes $SiO_2$ film or $Si_2N_4$ film that serves as the protection film; and 107 denotes the cavitation proof film that protects the protection film 106 from the chemical and physical shocks that follow the heat generation of the resistive layer 104. Also, a reference numeral 108 designates the heat-activation unit of the resistive layer 104 in the area where no electrode wiring 105 is arranged. These constituents are formed by the application of semiconductor process technologies and techniques.

Figure 14:
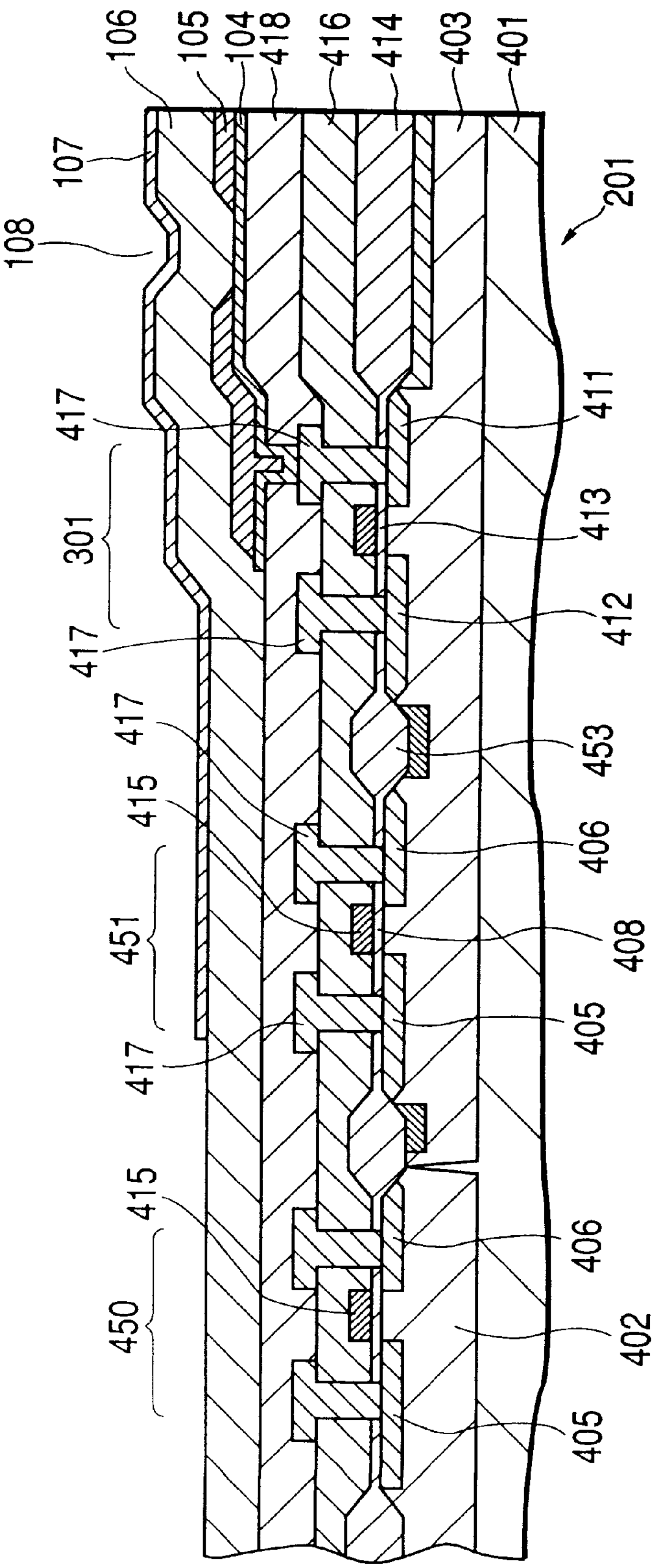
FIG. 14 is a cross-sectional view that shows, schematically, the main element represented in FIG. 13 when the element is cut off vertically.

FIG. 14 is a cross-sectional view that shows schematically the main element when it is cut vertically.

On the Si substrate of P-type conductor, there are structured the P-MOS 450 on the N-type well region 402 and the N-MOS 451 on the P-type well region 403 by means of impurities induction and diffusion or some other ion plantation using the general MOS process. The P-MOS 450 and the N-MOS 451 comprise the gate wiring 415 formed by poly-Si deposited by the application of CVD method in a thickness of 4,000 Å or more and 5,000 Å or less through the gate-insulation film 408 in a thickness of several hundreds of n, respectively; and the source region 405, the drain region 406, and the like formed by the induction of N-type or P-type impurities. Then, the C-MOS logic is constructed by these P-MOS and N-MOS.

Here, the N-MOS transistor for use of element driving is constructed by the drain region 411, the source region 412, and the gate wiring 413, among some others, on the P-well substrate also by the processes of impurity induction and diffusion or the like.

In this respect, a description has been provided of the structure that uses N-MOS transistors, but this invention is not necessarily limited to the use of the N-MOS transistors. It may be possible to use any type of transistors if only the transistors are capable of driving a plurality of heat-generating elements individually, while having the function to achieve the fine structure as described above.

Also, the device separation is executed by the formation of the oxide-film separation areas 453 by means of the filed oxide film in a thickness of 5,000 Å or more and 10,000 Å or less. This filed oxide film is arranged to function as the first layer of the heat-accumulation layer 414 under the heat-activation unit 108.

After each of the elements is formed, the interlayer insulation film 416 is accumulated in a thickness of approximately 7,000 Å by PSG, BPSG film, or the like by the application of CVD method. Then, smoothing treatment or the like is given by means of heat treatment. After that, wiring is conducted through the contact hole by the Al electrode 417 that becomes the first wiring layer. Subsequently, by the application of plasma CVD method, the interlayer insulation film 418, such as the $SiO_2$ film, is accumulated in a thickness of 10,000 Å or more and 15,000 Å or less. Then, by way of the through hole, the $TaN_{0.8,hex}$ film is formed as the resistive layer 104 in a thickness of approximately 1,000 Å by the application of the DC sputtering method. After that, the second wiring layer Al electrode is formed to serve as the wiring to each of the heat-generating elements.

As the protection film 106, the $Si_3N_4$ film is formed in a thickness of approximately 10,000 Å by the application of plasma CVD. On the uppermost layer, the cavitation proof layer 107 is formed with Ta or the like in a thickness of approximately 2,500 Å.

As described above, in accordance with the present embodiment, the materials that form the liquid-flow path member and the elemental substrate are all Si as its main component.

Now, with reference to FIGS. 15A and 15B and FIGS. 16G to 16J, a description will be provided of a method for manufacturing a substrate used for the ink jet recording head of the present embodiment.

Figure 15A:
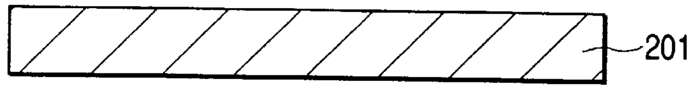
FIGS. 15A, 15B, 15C, 15D, 15E and 15F are views that illustrate a method for manufacturing a liquid jet recording head in accordance with a fifth embodiment of the present invention.
Figure 15B:
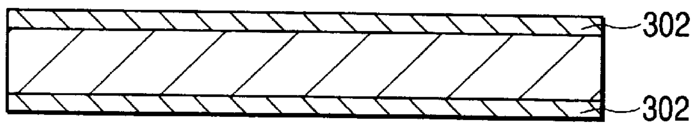
Figure 15C:
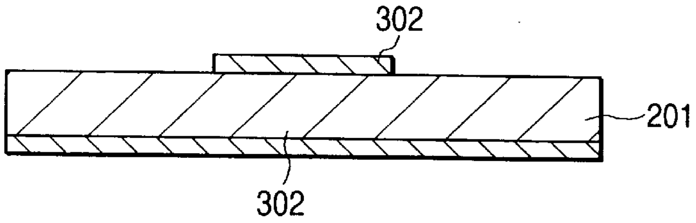
Figure 15D:
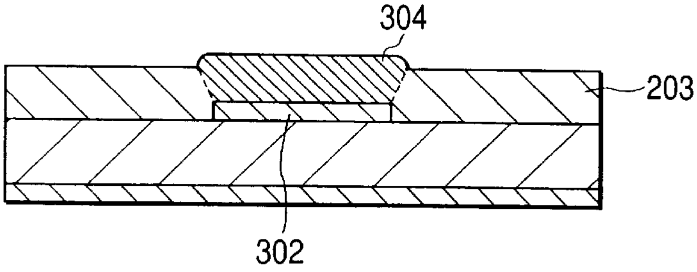

At first, in FIG. 15A, the elemental substrate 201 is formed in the manner as described in conjunction with FIGS. 3A and 3B and FIGS. 4A to 4H. To briefly describe, the driving element is formed on the Si [100] substrate by the application of the thermal diffusion and ion implantation or some other semiconductor process. Further, the wiring and heat-generating elements, which are connected to the driving element, are formed. Then, as shown in FIG. 15B, the surface and the reverse side of the elemental substrate 201 are all covered by the oxide film 302 to form the portion covered by the oxide film ($SiO_2$ film) 302 and the portion where the elemental substrate 201 is exposed on the surface of the elemental substrate 201 by means of photolithographic method as shown in FIG. 15C. After that, by means of epitaxial development, such as the low-temperature epitaxial development, Si is developed in a thickness of approximately 20 μm all over the surface of the elemental substrate 201 as shown in FIG. 15D. At this juncture, the monocrystal Si 203 is formed on the portion where the elemental substrate 201 is exposed, and the polycrystal Si 304 is formed on the portion covered by the oxide film 302.

Figure 15E:
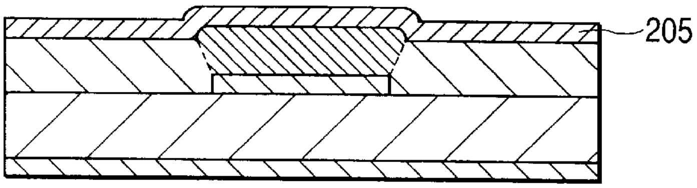
Figure 15F:
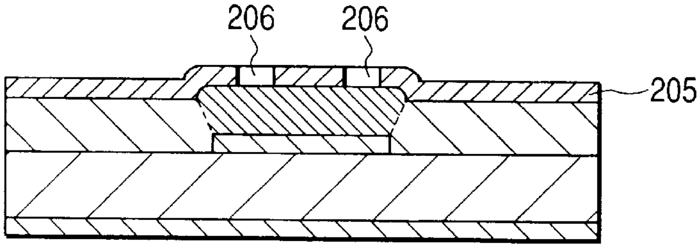
Figure 16G:
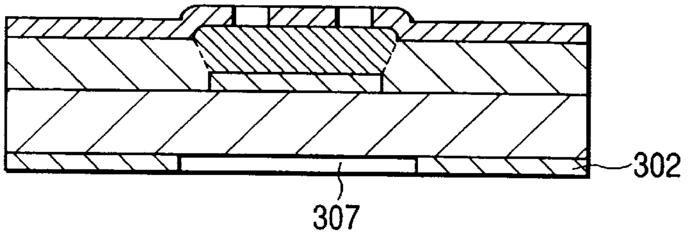
FIGS. 16G, 16H, 16I and 16J are views that illustrate the method for manufacturing the liquid jet recording head in accordance with a fifth embodiment of the present invention.
Figure 16H:
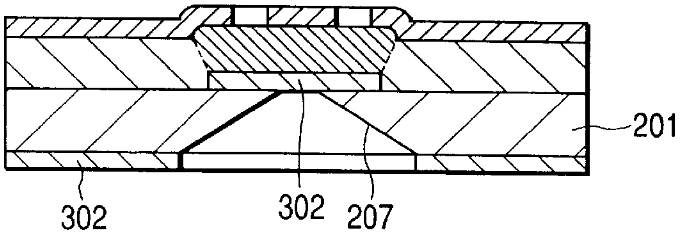
Figure 16I:
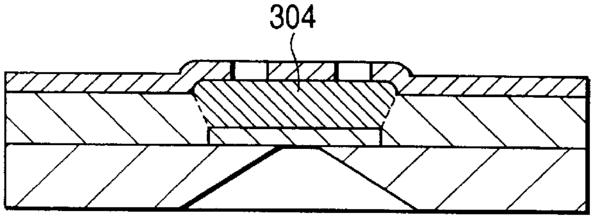
Figure 16J:
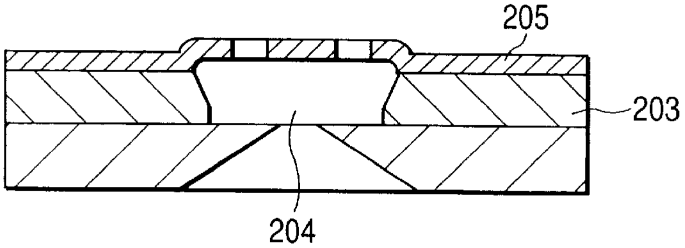

Then, as shown in FIG. 15E, the SiN film 205 is formed in a thickness of approximately 5 μm by the application of the CVD method or the like all over the surfaces of the monocrystal Si 203 and the polycrystal Si 304. Subsequently, as shown in FIG. 15F, by means of the photolithographic method, the orifice holes (discharge openings) 206 are formed on the SiN film 205 on the polycrystal Si 304 for ink discharges. Then, part of the oxide film 302 on the reversed side of the elemental substrate 201 is exposed by means of the photolithographic method. After that, the film is removed by use of buffered hydrofluoric acid. In this manner, as shown in FIG. 15G, the window 307 is used for use of anisotropic etching. Then, the through hole (supply opening) 207 for use of ink supply is formed on the elemental substrate 201 by means of the anisotropic etching using tetramethyl ammonium hydroxide as shown in FIG. 15H, and the $SiO_2$ film 302 formed on the surface of the elemental substrate 201 is exposed in order to develop the polycrystal Si 304. Subsequent to having formed the through hole 207, the $SiO_2$ film 302 on the surface and the reverse side of the elemental substrate 201 is removed using buffered hydrofluoric acid as shown in FIG. 15I. Lastly, using tetramethyl ammonium hydroxide again only the polycrystal Si film 304 is removed by etching as shown in FIG. 15J to form the liquid-flow paths. In other words, since the etching rate is largely different between the monocrystal Si 203, the SiN film 205, and the polycrystal Si 304, the monocrystal Si 203 and the SiN film 205 are left intact if the etching is suspended at the completion of the polycrystal Si etching, hence forming the liquid-flow paths. With the processes described above, it is possible to form the liquid-flow paths 204 structured with the side walls of the monocrystal Si 203 on the elemental substrate 201 whose main component is Si, and also, with the ceiling of the SiN film 205. Then, the substrate thus formed in the above processes is cut off per chip to provide each of the ink jet recording heads as shown in FIG. 11.

(Sixth Embodiment)

Figure 17:
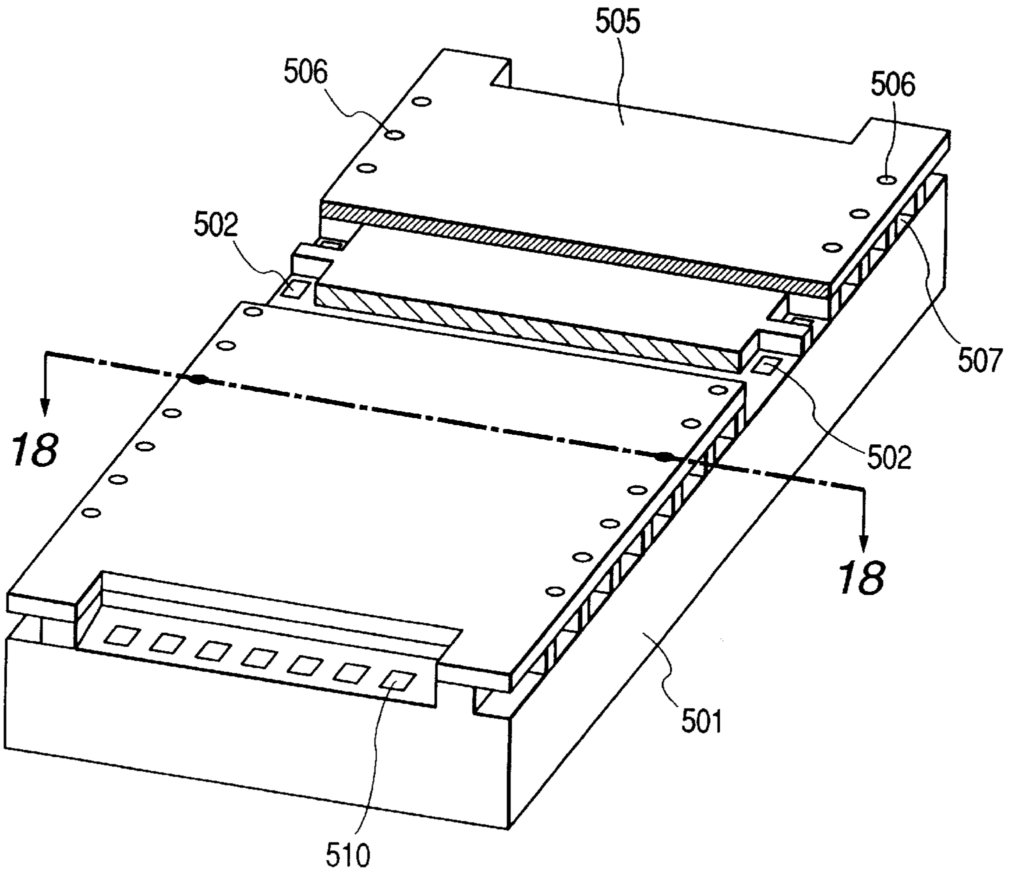
FIG. 17 is a perspective view that shows most suitably a liquid-jet head in accordance with a sixth embodiment of the present invention.
Figure 18:
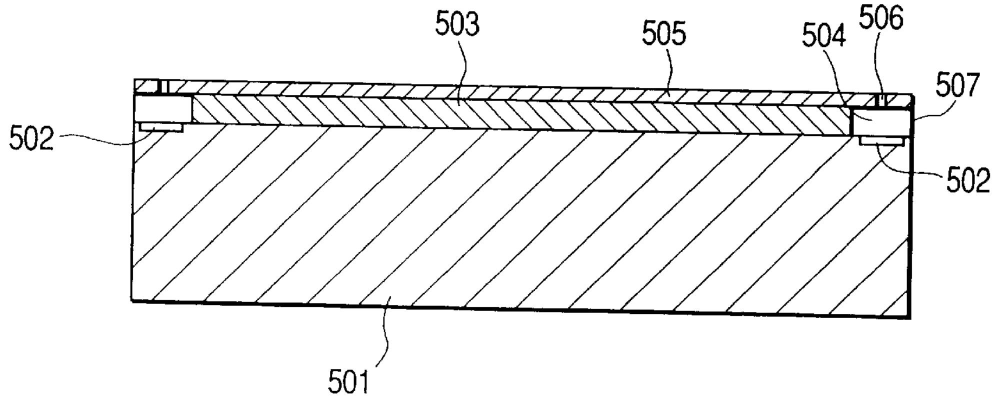
FIG. 18 is a cross-sectional view taken along line 18—18 in FIG. 17.

In place of the head structure described in accordance with the fifth embodiment, it is conceivable to structure a head for which liquid is supplied from the side end of the substrate, not from the substrate side. FIG. 17 is a perspective view that shows most suitably an ink jet recording head of the present embodiment. FIG. 18 is a cross-sectional view taken along line 18—18 in FIG. 17. The ink jet recording head of the present embodiment shown in FIGS. 17 and 18 comprises the elemental substrate 501, which is provided with a plurality of heat-generating elements 502 in line on both side portions on the surface of the Si substrate; a plurality of liquid-flow paths 504 that distribute liquid to each of the heat-generating elements 502; the monocrystal Si 503 that forms side walls of the liquid-flow paths on the elemental substrate 501, the SiN film 505 formed on the monocrystal Si 503 to produce the ceiling of the liquid-flow paths 504; a plurality of discharge openings (ports) 506 that face each of the heat-generating elements; and supply openings 507 to supply liquid to each of the liquid-flow paths on both sides of the elemental substrate 501. In this way, the monocrystal Si 503 and the SiN film 505 become the liquid-flow-path member that forms the liquid-flow paths 504 on the elemental substrate 501. Here, the monocrystal Si 503 does not cover the surface of both side ends of the elemental substrate 201 where no heat-generating elements and liquid-flow paths are arranged, but the electric pads 510 are formed to supply electric signals to each of the heat-generating elements 502 from the outside.

A structure of this kind can be produced by forming the polycrystal Si on both sides of one substrate in the processes described in accordance with the fifth embodiment. Now, in conjunction with FIGS. 19A to 19F and FIGS. 20F and 20H, a description will be provided of the method for manufacturing the ink jet recording head of the present embodiment.

Figure 19A:
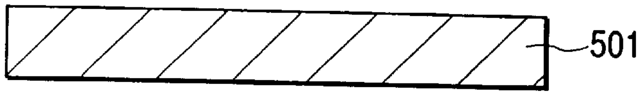
FIGS. 19A, 19B, 19C, 19D, 19E and 19F are views that illustrate a method for manufacturing liquid-jet heads in accordance with the sixth embodiment of the present invention.
Figure 19B:
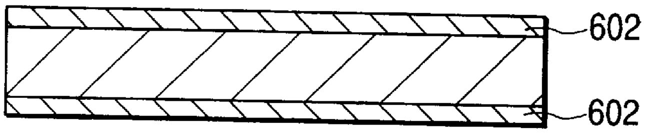
Figure 19C:
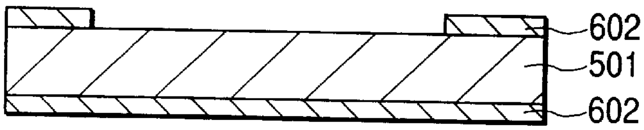
Figure 19D:
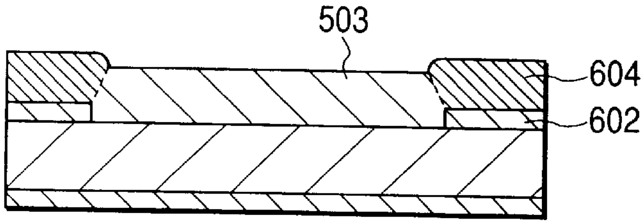

At first, in FIG. 19A, the elemental substrate 501 is formed in the same manner as described in accordance with the fifth embodiment shown in FIGS. 13 and 14. To briefly describe it, the driving element is formed on the Si [100] substrate by the application of thermal diffusion and ion implantation or some other semiconductor process. Further, the wiring and heat-generating elements, which are connected to the driving element, are formed. Then, as shown in FIG. 19B, the surface and the reverse side of the elemental substrate 501 are all covered by the oxide film 602 to form the portion covered by the oxide film ($SiO_2$ film) 602 and the portion where the elemental substrate 501 is exposed on the surface of the elemental substrate 501 by means of photolithographic method as shown in FIG. 19C. In this case, different from the fifth embodiment, the surface of the side ends of the substrate 501 are covered by the oxide film 602. Then, the portions thus covered by the oxide film 602 are formed in accordance with the desired flow-path pattern. After that, by means of epitaxial development, such as the low-temperature epitaxial development, Si is developed in a thickness of approximately 20 $\mu$m all over the surface of the elemental substrate 501 as shown in FIG. 19D. At this juncture, the monocrystal Si 503 is formed on the portion where the elemental substrate 201 is exposed, and the polycrystal Si 604 is formed on the portion covered by the oxide film 602.

Figure 19E:
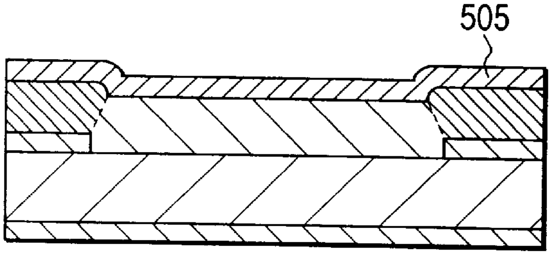
Figure 19F:
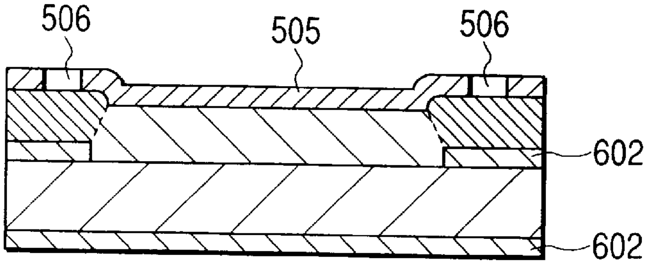
Figure 20G:
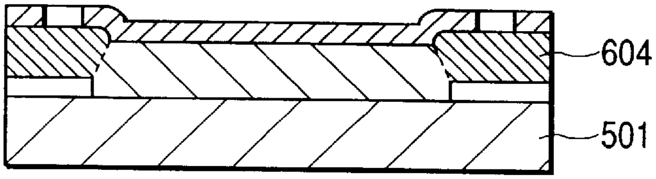
FIGS. 20G and 20H are views that illustrate the method for manufacturing liquid-jet heads in accordance with the sixth embodiment of the present invention.
Figure 20H:
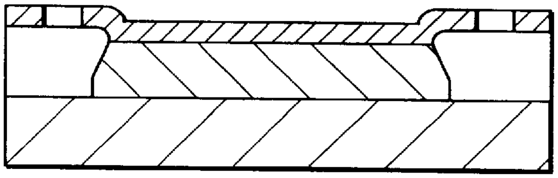

Then, as shown in FIG. 19E, the SiN film 505 is formed in a thickness of approximately 5 $\mu$m by the application of the CVD method or the like all over the surfaces of the monocrystal Si 503 and the polycrystal Si 504. Subsequently, as shown in FIG. 19F, by means of the photolithographic method, the orifice holes (discharge ports) 506 are formed on the SiN film 505 on the polycrystal Si 504 for ink discharges. After that, the oxide film 602 formed on the surface of the side ends and the reverse side of the substrate 501 are removed by use of buffered hydrofluoric acid as shown in FIG. 20G. Lastly, using tetramethyl ammonium hydroxide, the polycrystal Si film 504 is removed by etching as shown in FIG. 20H to form the liquid-flow paths. In other words, since the etching rate is largely different between the monocrystal Si 503, the SiN film 505, and the polycrystal Si, the monocrystal Si 503 and the SiN film 505 are left intact if the etching is suspended at the completion of the polycrystal Si etching, hence forming the liquid-flow paths. With the processes described above, it is possible to form the liquid-flow paths 504 structured with the side walls of the monocrystal Si 503 on the elemental substrate 501 whose main component is Si, and also, with the ceiling of the SiN film 505. Then, the substrate thus formed in the above processes is cut off per chip to provide each of the ink jet recording heads as shown in FIG. 17.

(The Other Embodiment)

Figure 21:
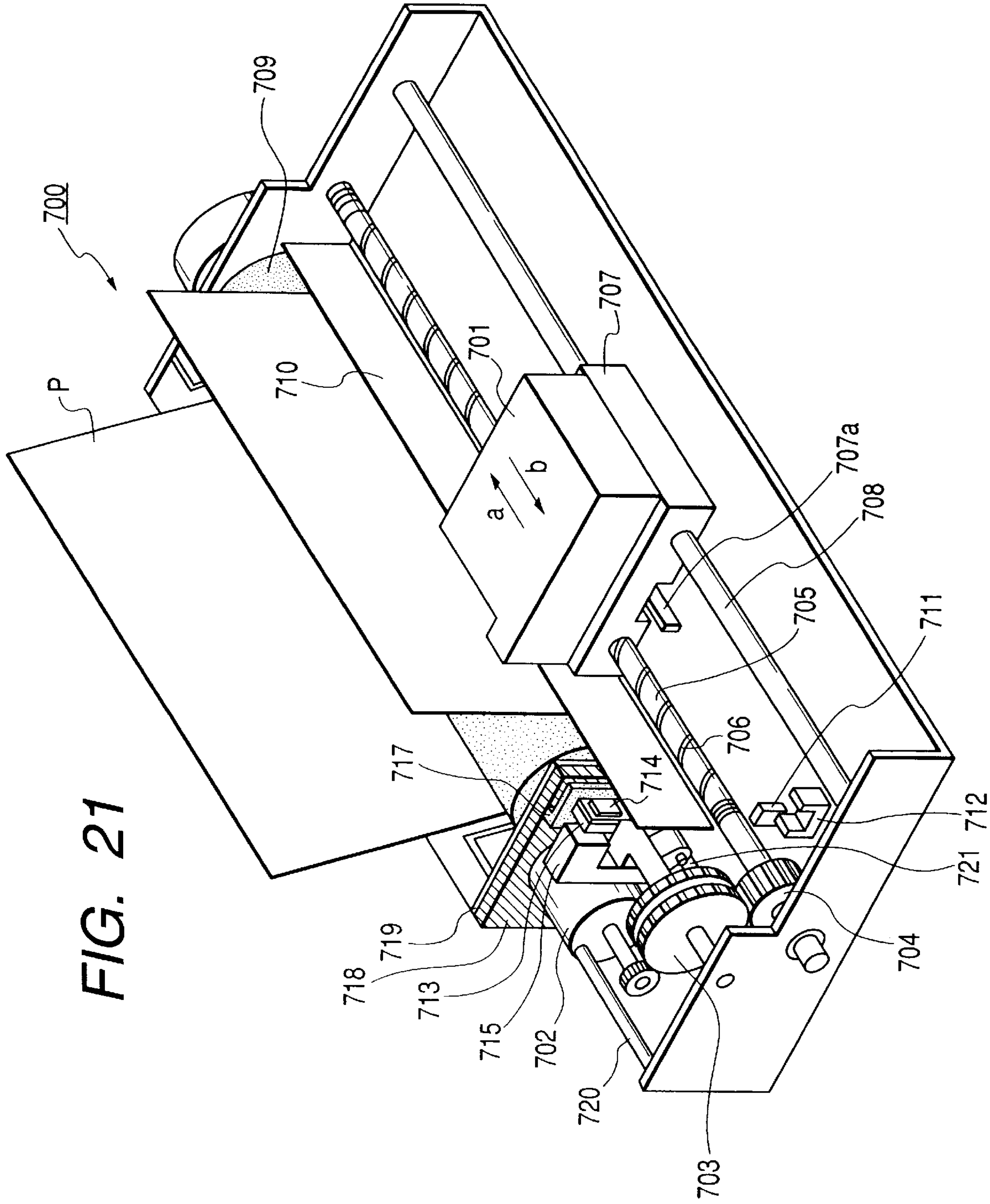
FIG. 21 is a perspective view that schematically shows one example of the image recording apparatus capable of mounting the liquid-jet head of each embodiment of the present invention.

FIG. 21 is a perspective view which schematically shows one example of the image recording apparatus to which the ink jet recording head of the above embodiments is applicable for use when being mounted on it. In FIG. 21, a reference numeral 701 designates a head cartridge that is integrally formed with the ink jet recording head of the above embodiments and a liquid containing tank. The head cartridge 701 is mounted on the carriage 707, which engages with the spiral groove 706 of the lead screw 705 rotative by being interlocked with the regular and reverse rotation of a driving motor 702 through the driving power transmission gears 703 and 704. Then, by means of the driving power of the driving motor 702, the head cartridge reciprocates together with the carriage 707 in the directions indicated by arrows a and b. With the use of a recording-medium-supply device (not shown), a printing sheet (recording medium) P is carried on a platen roller 709 in cooperation with a sheet pressure plate 710 that presses the printing sheet P to the platen roller 709 all over in the traveling direction of the carriage.

In the vicinity of one end of the lead screw 705, photocouplers 711 and 712 are arranged. The photocouplers serve as home-position sensing means that detects and confirms the presence of the lever 707*a* of the carriage 707 in this region in order to switch over the rotational directions of the driving motor 702 and the like. In FIG. 21, a reference numeral 713 designates a supporting member of a cap 714 that covers the front end of the head cartridge 701 where the discharge openings (ports) of ink jet recording head are present. Also, a reference numeral 715 designates the ink suction means that sucks the ink that has been retained in the interior of the cap 714 due to the idle discharges of the liquid jet head or the like. The suction recovery of the liquid jet head is performed by this suction means 715 through the aperture arranged in the cap. A reference numeral 717 designates a cleaning blade; 718 denotes a member that makes the blade 717 movable in the forward and backward directions (in the direction orthogonal to the traveling direction of the carriage 707). The blade 717 and this member 718 are supported by the main-body supporting member 719. The blade 717 is not necessarily limited to this mode, but it should be good enough to adopt any one of known cleaning blades. A reference numeral 720 designates the lever that effectuates suction for the suction recovery operation. This lever moves along the movement of the cam 721 that engages with the carriage 707. The movement thereof is controlled by known transmission means, such as the clutch that switches over the transmission of the driving power from the driving motor 702. Here, the recording-control unit (which is not shown here) is arranged on the main body of the apparatus in order to control the provision of signals to the heat-generating elements on the liquid jet head mounted on the head cartridge 701, and also, to control the driving of each of the mechanisms described above.

The image recording apparatus 700 thus structured performs its recording on the printing sheet (recording medium) P with the head cartridge 701 that reciprocates over the entire width of the printing sheet P that is carried on the platen 709 by means of a recording material supply device (not shown).

What is claimed is:

1. A method for manufacturing ink jet recording heads, comprising the steps of:

forming a film of a soluble first inorganic material in the form of an ink-flow path pattern using the first inorganic material on a substrate having an ink discharge pressure-generating element formed thereon;

forming a film of a second inorganic material becoming ink flow walls on said film of the first inorganic material using the second inorganic material;

forming ink discharge openings on said film of the second inorganic material above said ink discharge pressure generating elements; and eluting said film of the first inorganic material, wherein said second inorganic material is silicon nitride and is formed by film formation.

2. A method for manufacturing ink jet recording heads according to claim 1, wherein said first inorganic material is PSG (Phospho-Silicate Glass), BPSG (Boron Phospho-Silicate Glass), or silicon oxide.

3. A method for manufacturing ink jet recording heads according to claim 2, wherein said step of eluting said film of the first inorganic material is a step of etching said film of the first inorganic material using hydrofluoric acid.

4. A method for manufacturing ink jet recording heads according to claim 1, wherein said film of the first inorganic material is a film having Al as the main component thereof.

5. A method for manufacturing ink jet recording heads according to claim 4, wherein said step of eluting said film of the first inorganic material is a step of etching said film of the first inorganic material using phosphoric acid or hydrochloric acid.

6. A method for manufacturing ink jet recording heads according to claim 1, wherein ICP etching is used for the step of forming ink discharge openings on said film of the second inorganic film.

7. A method for manufacturing ink jet recording heads according to claim 1, further comprising the steps of:

forming a silicon oxide film on the surface of said substrate;

forming on the surface of said substrate a portion covered with the silicon oxide film, and a portion having the surface of said substrate exposed by selectively removing said silicon oxide film on the surface of said substrate;

as said step of forming a film of a first inorganic material, forming a polycrystal Si layer on the portion covered by said silicon oxide film, at the same time, forming a monocrystal Si layer on the portion having the surface of said substrate exposed by developing Si epitaxially in a desired thickness all over the surface of said substrate including the portion covered by said silicon oxide film;

as said step of forming a film of a second inorganic material, forming an SiN film all over the surface of said monocrystal Si layer and said polycrystal Si layer in a desired thickness;

removing the portion covered with said silicon oxide film formed on the surface of said substrate by forming a through hole becoming a supply opening, for supplying liquid to an ink flow path, from the reverse side of said substrate; and in said eluting step, forming the ink flow path by removing only said polycrystal Si layer.

8. A method for manufacturing ink jet recording heads according to claim 1, further comprising the steps of:

forming a silicon oxide film on the surface of said substrate;

forming on the surface of a side portion of said substrate a portion covered with the silicon oxide film and exposing the surface of said substrate other than said side portion by selectively removing said silicon oxide film on the surface of said substrate, as said step of forming a film of a first inorganic material, forming a polycrystal Si layer on the portion covered by said silicon oxide film, at the same time, forming a monocrystal Si layer on the portion having the surface of said substrate exposed by developing Si epitaxially in a desired thickness all over the surface of said substrate including the portion covered by said silicon oxide film;

as said step of forming a film of a second inorganic material, forming an SiN film all over the surface of said monocrystal Si layer and said polycrystal Si layer in a desired thickness;

removing the portion covered with said silicon oxide film formed on said side portion of said substrate; and in said eluting step, forming an ink flow path and supply openings for supplying liquid to the ink flow path by removing only said polycrystal Si layer.

* * * * *